(12) United States Patent
Okuno et al.

(10) Patent No.: US 9,535,730 B2
(45) Date of Patent: Jan. 3, 2017

(54) COMMUNICATION APPARATUS AND CONFIGURATION METHOD

(71) Applicant: Hitachi, Ltd., Tokyo (JP)

(72) Inventors: Michitaka Okuno, Tokyo (JP); Yuji Tsushima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 154 days.

(21) Appl. No.: 14/072,967

(22) Filed: Nov. 6, 2013

(65) Prior Publication Data

US 2014/0130046 A1    May 8, 2014

(30) Foreign Application Priority Data

Nov. 8, 2012 (JP) .................................. 2012-246583

(51) Int. Cl.
*G06F 9/45* (2006.01)
*G06F 9/455* (2006.01)

(52) U.S. Cl.
CPC .................................. *G06F 9/45533* (2013.01)

(58) Field of Classification Search
CPC ................................................... G06F 9/45533
See application file for complete search history.

(56) References Cited

U.S. PATENT DOCUMENTS

| 2012/0144391 | A1 | 6/2012 | Ueda | |
| 2012/0151477 | A1* | 6/2012 | Sinha et al. | 718/1 |
| 2012/0151480 | A1* | 6/2012 | Diehl et al. | 718/1 |
| 2012/0278802 | A1* | 11/2012 | Nilakantan et al. | 718/1 |
| 2013/0007740 | A1* | 1/2013 | Kikuchi et al. | 718/1 |

FOREIGN PATENT DOCUMENTS

| JP | 2006-011506 A | 1/2006 |
| JP | 2007-066265 A | 3/2007 |
| JP | 2009-230655 A | 10/2009 |
| JP | 2011-248690 A | 12/2011 |
| JP | 2012-118827 A | 6/2012 |

OTHER PUBLICATIONS

Luyuan Fang et al. "The Evolution of Carrier Ethernet Services—Requirements and Deployment Case Studies", IEEE Communications Magazine, Mar. 2008, pp. 69-76.

* cited by examiner

*Primary Examiner* — Emerson Puente
*Assistant Examiner* — Steven Do
(74) *Attorney, Agent, or Firm* — Volpe and Koenig, P.C.

(57) ABSTRACT

An information processing unit of a communication apparatus includes a non-volatile memory and a volatile memory. A control unit of the communication apparatus loads the boot image from the non-volatile memory to the volatile memory upon activation of the communication apparatus, activates the virtual machine template in the loaded boot image on the volatile memory, deactivates the activated virtual machine template after reconfiguring the activated virtual machine template to minimum required configuration to execute a virtual machine. Upon receipt of a request for addition of communication service, the control unit creates a replicate virtual machine template by replicating the deactivated virtual machine template, activates the replicate virtual machine template, reconfigures the activated replicate virtual machine template to configuration according to the request for addition of communication service, and executes the reconfigured replicate virtual machine template as a virtual machine to provide the communication service.

18 Claims, 22 Drawing Sheets

FIG. 6

SERVICE TABLE 700

| 710 | 711 | 712 | 713 | 714 | 715 | 716 | 717 | 718 | 719 | 720 | 721 | 722 |
|---|---|---|---|---|---|---|---|---|---|---|---|---|
| TENANT | BAND-WIDTH | SERVICE | SERVICE QUALITY (DELAY SENSITIVITY) | ALLOCATED CPU CORE | ALLOCATED MEMORY | STAG | LTAG | PORT | APPARATUS NUMBER | INFORMATION PROCESSING CARD NUMBER | VM NUMBER | VNIC INFORMATION |
| A | 100Mbps | IPS | Severe | DEDICATED, 1 | 4GB | 0x000A | 0x001A | WAN | 1 | 1 | 1 | VMAC1, VIP1 |
| | | | | | | | 0x002A | LAN | | | | VMAC2, VIP2 |
| | | WOC | Severe | DEDICATED, 1 | 8GB | | 0x003A | WAN | 1 | 1 | 2 | VMAC3, VIP3 |
| | | | | | | | 0x004A | LAN | | | | VMAC4, VIP4 |
| B | 50Mbps | WOC | Severe | DEDICATED, 1 | 8GB | 0x000B | 0x005B | WAN | 1 | 1 | 3 | VMAC5, VIP5 |
| | | | | | | | 0x006B | LAN | | | | VMAC6, VIP6 |
| | | IDS | Severe | SHARED,1 | 2GB | | 0x007B | WAN | 1 | 1 | 4 | VMAC7, VIP7 |

REQUESTED BY TENANTS (DETERMINED BY ADMINISTRATOR) 725

ALLOCATED BY CONTROL PROGRAM 726

FIG. 7

| INFORMATION PROCESSING CARD NUMBER | PHYSICAL RESOURCES | | ALLOCATED RESOURCES | | |
|---|---|---|---|---|---|
| | NUMBER OF CORES (NUMBER OF THREADS) | AMOUNT OF MEMORY | NUMBER OF DEDICATED CORES | NUMBER OF SHARED CORES | AMOUNT OF MEMORY |
| 1 | 8 | 32GB | 1 | 1 | 8GB |
| 2 | 8 | 32GB | 1 | 1 | 8GB |
| 3 | 8 | 32GB | 1 | 1 | 8GB |

| COMMUNICATION NODE APPARATUS NUMBER | UNUSED LTAG | NUMBER OF UNUSED LTAG'S |
|---|---|---|
| 1 | 0001, 0003, ... Y | 4087 |
| 2 | 0001, 0003, ... 4094 | 4094 |
| ... | ... | ... |

RESOURCE MANAGEMENT TABLE

FIG. 8

| | IN TAG | IN PORT | OUT TAG | OUT PORT | SERVICE |
|---|---|---|---|---|---|
| TAG CONVERSION RULES FOR TENANT A 60 | STAG:000A | WAN | LTAG:001A | CARD#1 | FW |
| | LTAG:002A | CARD#1 | LTAG:003A | CARD#1 | WOC |
| | LTAG:004A | CARD#1 | STAG:000A | LAN | NONE |
| | STAG:000A | LAN | LTAG:004A | CARD#1 | WOC |
| | LTAG:003A | CARD#1 | LTAG:002A | CARD#1 | FW |
| | LTAG:001A | CARD#1 | STAG:000A | WAN | NONE |
| TAG CONVERSION RULES FOR TENANT B 61 | STAG:000B | WAN | LTAG:005B LTAG:007B | CARD#1 CARD#1 | WOC IDS |
| | LTAG:006B | CARD#1 | STAG:000B | LAN | NONE |
| | STAG:000B | LAN | LTAG:006B | CARD#1 | WOC |
| | LTAG:005B | CARD#1 | STAG:000B | WAN | NONE |
| | ... | ... | ... | ... | ... |

CONVERSION TABLE

MANAGEMENT TERMINAL SCREEN

FIG. 21  COMPARED ART

COMMUNICATION APPARATUS AND CONFIGURATION METHOD

CLAIM OF PRIORITY

The present application claims priority from Japanese patent application JP2012-246583 filed on Nov. 8, 2012, the content of which is hereby incorporated by reference into this application.

BACKGROUND

This invention relates to a communication apparatus.

In cloud computing (hereinafter, abbreviated as cloud), a server in a data center is accessed from remote sites; accordingly, a network among the sites and the data center is requisite. In many cases, the network used in the cloud for consumers is the Internet and the network used in the cloud for businesses is a virtual network system including VPNs (Virtual Private Networks) in view of security and network performance.

For a plurality of virtual networks to coexist in a single physical network, a system ensuring independencies of the virtual networks is necessary.

Telecommunications carriers use wide area Ethernet (registered trademark; the same applies hereinafter) employing a technology called extended VLAN tagging (VLAN stands for Virtual Local Area Network) or provider bridging (802.1Q-in-802.1Q, Q-in-Q, double tagging) standardized by IEEE 802.1ad to achieve the independencies of virtual networks. As to the extended VLAN tagging, refer to *The Evolution of Carrier Ethernet Services—Requirements and Deployment Case Studies*, Luyuan Fang et al., IEEE Communications Magazine, March, 2008, pp. 69-76.

The extended VLAN tagging is a technology that adds another VLAN tag to a VLAN tagged Ethernet Frame to make communications using Ethernet Frames including multiple VLAN tags.

The VLAN tag of an Ethernet Frame which is added on the outer side of the Ethernet Frame is called STAG (Service TAG). The network apparatuses for extended VLAN tagged communication identify virtual networks for individual companies (tenants) by S-VLANs identified by STAGs to distribute Ethernet Frames to the individual virtual networks.

The VLAN tag of an Ethernet Frame which is added on the inner side than the STAG (on the payload-side of the Ethernet Frame) is called CTAG (Customer TAG). The network apparatuses for extended VLAN tagged communication identify individual networks in a business (tenant) by C-VLANs identified by CTAGs to distribute Ethernet Frames to individual office networks.

As described above, the extended VLAN tagged communication can be assured of independencies of networks among tenants and in each tenant by the STAG and the CTAG.

In the meanwhile, a telecommunications carrier uses a system called appliance (network appliance) specialized for a specific function to provide the tenants with a cloud communication service. Examples of the appliance include a WOC (Wide Area Network Optimization Controller) or a WAN accelerator for improving the communication speed between data centers or sites, an IDS/IPS (Intrusion Detection System/Intrusion Protection System) or a FW (Fire-Wall) for detecting or blocking an abnormal communication, and a session load balancer. The functions of these systems can improve the communication function and communication performance of the cloud. Accordingly, in the following description, cloud communication services having these functions are generally called communication services as a matter of convenience.

The appliances for providing communication services include quite a number of appliances which do not support network virtualization. For this reason, it is common to install such appliances in a site of a company or a data center logically configured to be private within a company.

However, for a telecommunications carrier to provide a plurality of companies (tenants) with a communication service as one of the cloud functions, it is expected that the appliance be installed in a shared apparatus having a function of a gateway in a switching office or a data center of the telecommunications carrier. The telecommunications carrier is required to configure the appliance for different virtual networks of individual companies (tenants).

For a telecommunications carrier to provide a plurality of client companies (multiple tenants) with a communication service such as WAN optimization as one of the cloud services, it is desirable to use at least one communication apparatus that can provide a plurality of communication services while assuring the tenants of independencies of both of their respective communications by virtual network system such as wide area Ethernet and communication services.

To assure the tenants of independencies of their respective network communications, extended VLAN tagged communication is employed. For a single communication apparatus to provide a plurality of services, the communication apparatus is required to run a plurality of virtual machines. Accordingly, it is desirable to use the extended VLAN tagged communications in coordination with the communication services executed in the virtual machines and vice versa.

To use extended VLAN tagged communications in coordination with the virtual machines in executing communication services, it is required to install different virtual machines for individual tenants and individual communication services in the communication apparatus.

The existing technology has a problem to be solved: To provide a suitable starting image matching a hardware configuration of a PC to be booted via a network (refer to JP 2006-011506 A).

JP 2006-011506 A provides a solution: Based on hardware configuration information sent from a boot node 200, a starting image selection part 101 in a boot server 100 selects a starting image matching the hardware configuration information from the starting images stored in a starting image storage part 200 and transfers it to a starting image selection part 103. The starting image selection part 103 returns the selected starting image to the boot node 200. In this way, the starting image matching the hardware configuration of the boot node 200 can be provided.

The existing technology has another problem to be solved: To allow high speed deployment processing when a plurality of VMs are deployed from one template (refer to JP 2009-230655 A).

JP 2009-230655 A provides a solution: The deployment acceleration system of the virtual machine is provided with: a server 100 having a virtual machine 132; storages 300-360 which store entity of the virtual machine 132 as a virtual disk 302; and a management server 200 which controls the server 100 and the storages 300-360, wherein the storage 300 has the template 301 in which an OS (Operating System) and applications used for the virtual disk are integrated, creates a plurality of duplicates of the template 301, distributes the duplicated templates to other storages. The other storages perform VM (Virtual Machine) deployment for installing individual information about the virtual machine including an IP address and a name of a computer to the duplicated templates. The management server 200 controls each storage so that all the number of times of VM deployment and all the number of times of duplication of the templates may be minimized.

SUMMARY

Booting a communication apparatus via a network with a computer connected with the communication apparatus by the technique disclosed in JP 2006-011506 A requires a large number of exchanges of commands and responses in a network generating long communication delay. Accordingly, implementing a virtual machine by network boot is affected by congestion of the network much more than inputting a boot image directly to the communication apparatus. In particular, this method has a problem that starting the services for a plurality of tenants takes long time.

In the meanwhile, to boot virtual machines for individually providing communication services to multiple tenants using the technique disclosed in JP 2009-230655 A, the communication apparatus is required to have a plurality of storage devices (non-volatile memories). However, conditions such as the physical area of the place where the telecommunications carrier installs the communication apparatus, the power consumption permitted to the communication apparatus, and the heat generated by the communication apparatus do not usually allow the communication apparatus to have a plurality of storage devices. In particular, the communication apparatus rarely includes a non-volatile magnetic memory such as a hard disk drive, which is generally used to store a boot image.

For this reason, the communication apparatus needs to store the boot image in a small capacity non-volatile semiconductor memory, such as a flash card. However, in the case of a large number of communication services provided by the communication apparatus and tenants provided with the communication services by the communication apparatus, the volume for the boot image is so large that the communication apparatus cannot store the boot image in a small capacity non-volatile semiconductor memory. Hence, the technique according to JP 2009-230655A raises a problem that the communication apparatus cannot store the boot image of the communication services for each tenant.

Accordingly, an object of this invention is, in implementing virtual machines for providing different communication services for individual virtual networks included in a network, to properly implement the virtual machines in a communication apparatus with a smaller amount of resources of the network and a non-volatile semiconductor memory or other device required to implement the virtual machines.

An aspect of this invention is a communication apparatus connected in a communication path between a server and a client for transmitting Ethernet Frames via a physical network. The communication apparatus includes an information processing unit including at least one virtual machine for executing a communication service to the Ethernet Frames, and a control unit for controlling the communication apparatus. The information processing unit includes a non-volatile memory for storing a boot image including a virtual machine template which is a program for executing a virtual machine; and a volatile memory used to execute the communication service. The control unit loads the boot image from the non-volatile memory to the volatile memory upon activation of the communication apparatus. The control unit activates the virtual machine template included in the loaded boot image on the volatile memory. The control unit deactivates the activated virtual machine template after reconfiguring the activated virtual machine template to minimum required configuration to execute a virtual machine. Upon receipt of a request for addition of communication service, the control unit creates a replicate virtual machine template by replicating the deactivated virtual machine template. The control unit activates the replicate virtual machine template. The control unit reconfigures the activated replicate virtual machine template to configuration in accordance with the request for addition of communication service. The control unit executes the reconfigured replicate virtual machine template as one of the at least one virtual machine to provide the communication service. According to a representative aspect of this invention, virtual machines are implemented in an apparatus for providing communication services with a smaller amount of resource consumption of the apparatus for providing the communication services.

Objects, configuration, and effects of this invention other than those described above are clarified in the following description of embodiments.

BRIEF DESCRIPTION OF THE DRAWINGS

FIG. 6 is an explanatory diagram illustrating a service table in the embodiment;

FIG. 7 is an explanatory diagram illustrating a resource management table in the embodiment;

FIG. 8 is an explanatory diagram illustrating a conversion table in the embodiment;

DETAILED DESCRIPTION OF THE EMBODIMENTS

Hereinafter, embodiments of this invention will be described with reference to the accompanying drawings. The same reference signs denote the same or equivalent elements throughout the drawings. For convenience of explanation, suffixes may be added to the reference signs for discrimination.

The following embodiment explains examples of applications of the configuration method of this invention to a communication node apparatus for providing clients (such as companies, referred to as tenants hereinafter) with a plurality of communication services (cloud communication services), such as WAN optimization and firewall, in different combinations in a virtual network system.

One of the communication services using a virtual network system is wide area Ethernet. The wide area Ethernet (registered trademark, the same applies hereinafter) is a service for connecting remote sites by transparently transmitting Ethernet frames (hereinafter Ethernet Frames) of tenants via a telecommunications carrier network. The wide area Ethernet provides Layer 2 VPNs using the VLAN technology.

The wide area Ethernet is a service allowing, under a condition where a plurality of companies (corresponding to tenants) having domestic and overseas offices share the physically same network, an office of some company to communicate with another office of the same company as if making communications via a logical LAN of the company without communicating with offices of the other companies.

The wide area Ethernet can be implemented by extended VLAN tagging standardized by IEEE 802.1ad or Ether over Ether standardized by IEEE 802.1ah. The former extended VLAN tagging is a technique that adds a VLAN tag for the telecommunications carrier to identify a tenant adjacent to and ahead of a VLAN tag to identify a network of each tenant in an Ethernet Frame. The extended VLAN tagging is also referred to as Q-in-Q or a provider bridge.

The latter Ether over Ether is a technique that encapsulates an Ethernet Frame for a tenant (client) with an Ethernet Frame for a telecommunications carrier. The Ether over Ether is also referred to as MAC-in-MAC or a provider backbone bridge.

Figure 1:
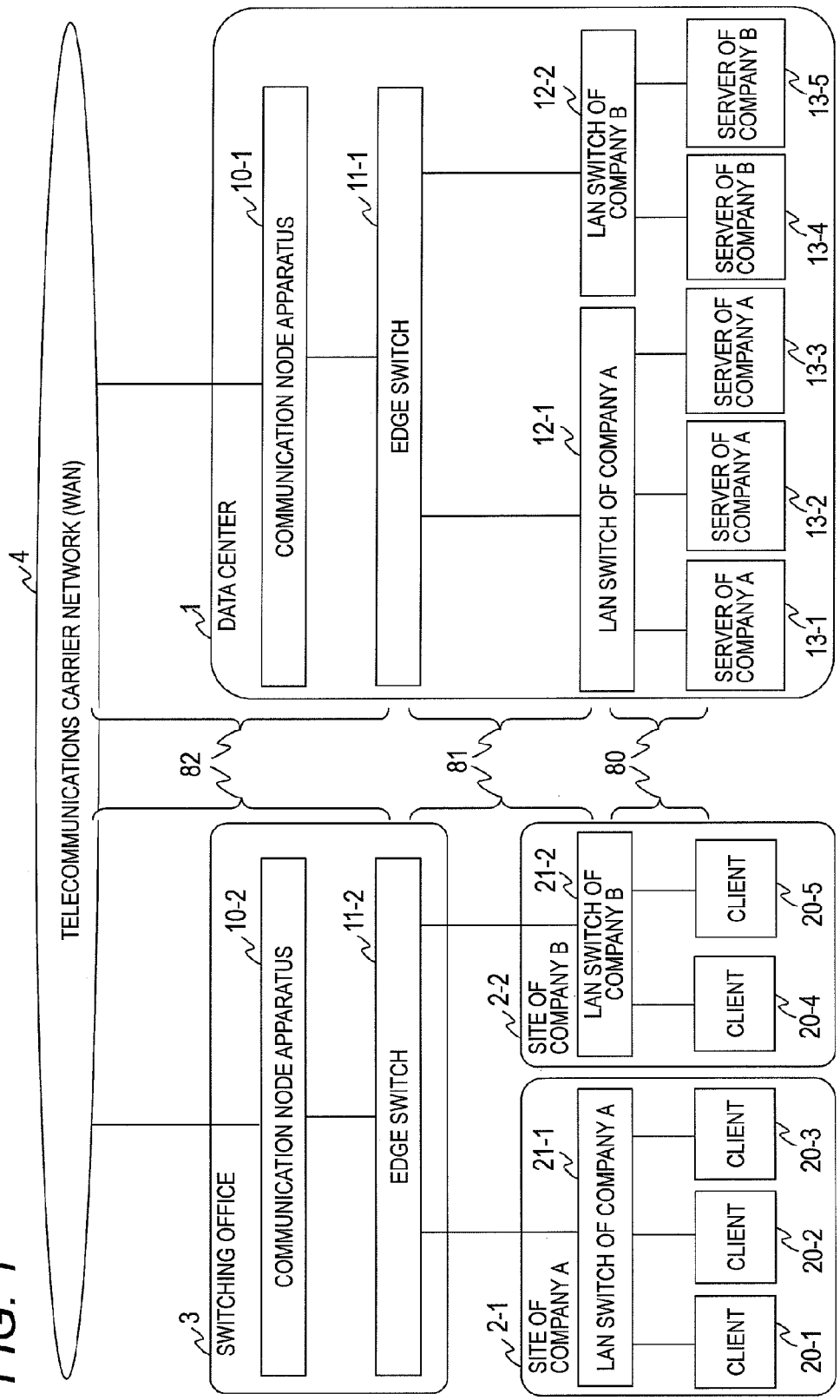
FIG. 1 is a block diagram illustrating a configuration of a system for providing communication services in an embodiment of this invention.

FIG. 1 is a block diagram illustrating a configuration of a system for providing communication services in this embodiment.

The system configuration shown in FIG. 1 illustrates a configuration of a network system for providing communication services. The network system of the embodiment includes a site 2-1 of Company A, a site 2-2 of Company B, a switching office 3, a telecommunications carrier network (WAN) 4, and a data center 1.

The system of FIG. 1 has two tenants: Company A and Company B. Each tenant has servers 13 and clients 20 which communicate with one another via a virtual network. A tenant in this embodiment is defined as a group including at least one client and at least one server and allocated a virtual network.

Company A has a site 2-1 of Company A and Company B has a site 2-2 of Company B. The site 2-1 of Company A includes a LAN switch 21-1 and a plurality of clients 20 (20-1 to 20-3) of Company A; the site 2-2 of Company B includes a LAN switch 21-2 and a plurality of clients 20 (20-4 and 20-5) of Company B.

The data center 1 includes a communication node apparatus 10-1, an edge switch 11-1, a plurality of LAN switches 12 (12-1 and 12-2), and a plurality of servers 13 (13-1 to 13-5). Company A has the LAN switch 12-1 and the servers 13-1 to 13-3; Company B has the LAN switch 12-2 and the servers 13-4 and 13-5.

Each tenant, Company A or Company B, is allocated a different virtual network. Company A makes communications within Company A via the virtual network configured for Company A. Furthermore, a single tenant is allocated virtual networks such as VLANs.

The switching office 3 includes a communication node apparatus 10-2 and an edge switch 11-2. The switching office 3, the WAN 4, the communication node apparatus 10-1 in the data center 1, and the edge switch 11-1 in the data center 1 constitute a system provided by a telecommunications carrier.

The communication node apparatuses 10 are apparatuses for providing communication services in this embodiment to the tenants. The communication node apparatuses 10 (10-1 and 10-2) provide communication services for individual tenants (or individual virtual networks) in accordance with the received Ethernet Frames.

The communication node apparatuses 10 may have a function of an edge switch 11. Then, the edge switches 11 in FIG. 1 are not necessary. The data center 1 in FIG. 1 includes only one communication node apparatus 10-1 but may include a plurality of communication node apparatuses 10. If the data center 1 includes a plurality of communication node apparatuses 10, communication node apparatuses 10 may be connected in a star topology with the communication node apparatus 10-1 in FIG. 1 in the center; alternatively, the communication node apparatus 10-1 in FIG. 1 and communication node apparatuses 10 may be connected in a row.

The switching office 3 may also include a plurality of communication node apparatuses 10, like the data center 1.

Figure 2:
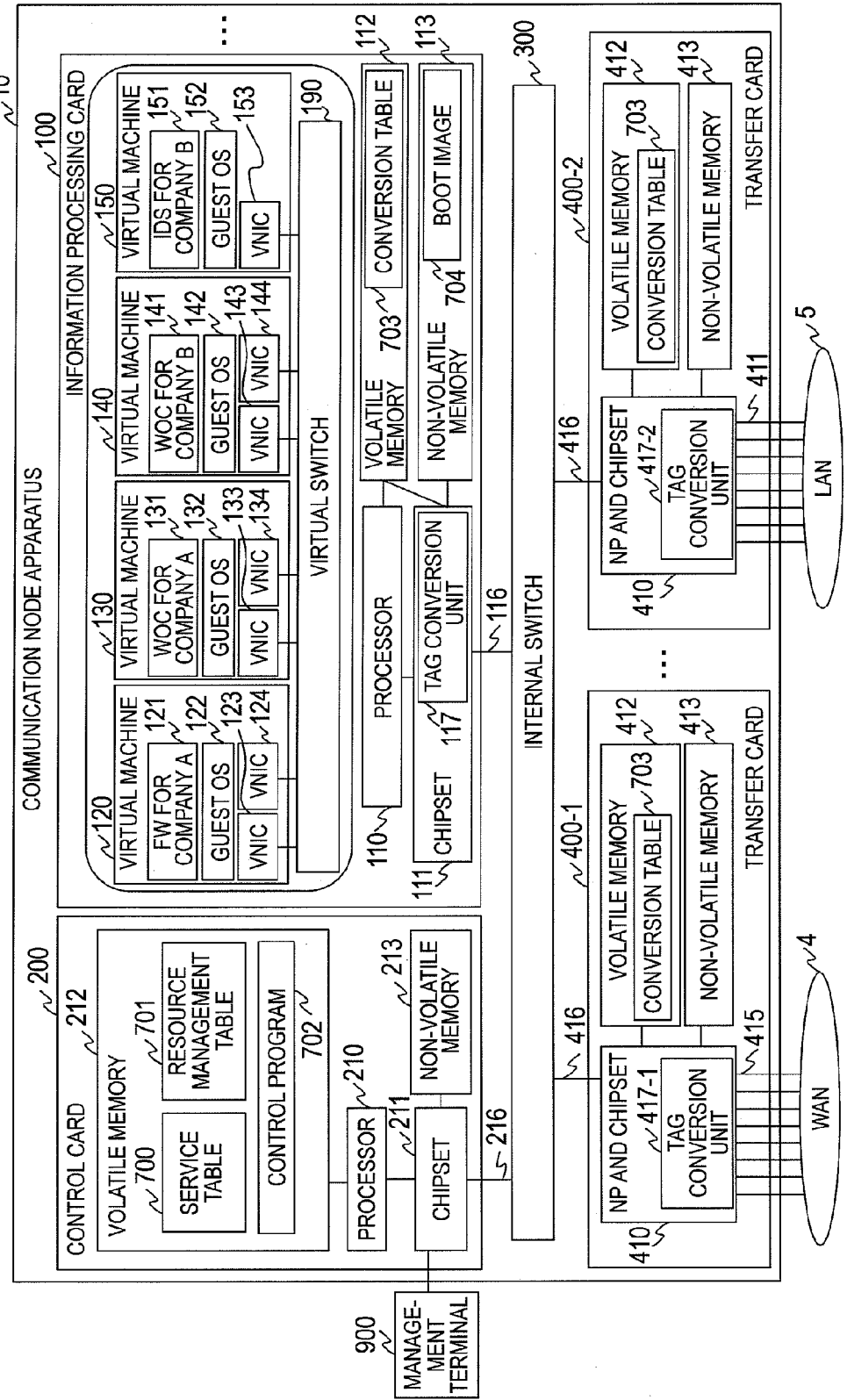
FIG. 2 is a block diagram illustrating a physical configuration of a communication node apparatus in the embodiment and a logical configuration implemented by the physical configuration.

FIG. 2 is a block diagram illustrating a physical configuration of a communication node apparatus 10 and a logical configuration implemented by the physical configuration.

A communication node apparatus 10 includes at least one transfer card 400, at least one information processing card 100, a control card 200, and an internal switch 300. The example of FIG. 2 includes two transfer cards 400. The LAN 5 shown in FIG. 2 is a network for connecting directly to the edge switch 11 not via the WAN 4.

The communication node apparatus 10 is connected with a management terminal 900, particularly at a chipset 211 in the control card 200.

The transfer card 400 is a processing unit for transferring Ethernet Frames. Since this embodiment provides explanation based on the Layer 2 using VLANs, this description employs the term Ethernet Frame, which however can be replaced by the term packet.

The information processing card 100 is a processing unit for executing communication services such as WAN optimization. The control card 200 is a processing unit for performing various configuration and control actions for the communication node apparatus 10. The internal switch 300 is a processing unit for connecting the cards included in the communication node apparatus 10.

The information processing card 100, transfer cards 400, and control card 200 shown in FIG. 2 are the elements of the communication node apparatus 10; but a part or all of the elements can be integrated in the apparatus. In such a case, the control card 200, information processing card 100, and transfer cards 400 respectively mean a control unit, an information processing unit, and transfer units.

A transfer card 400 includes a backplane interface 416, an NP and chipset 410, a volatile memory 412, and a non-volatile memory 413. The transfer card 400-1 shown in FIG. 2 is a processing unit for communicating with the WAN 4 via a network interface 415 and the transfer card 400-2 is a processing unit for communicating with the LAN switch 12 or the LAN switch 21 via a network interface 411.

The backplane interface 416 is an interface for connecting with the internal switch 300.

The NP and chipset 410 is a computing device for processing Ethernet Frames. The NP and chipset 410 includes an NP (Network Processor) and a chipset. The NP and chipset 410 includes a tag conversion unit 417.

The NP and chipset 410 extracts the destination of an Ethernet Frame received from the WAN 4 or the LAN 5 and transmits the Ethernet Frame to the LAN 5 or the WAN 4 in accordance with the extracted destination. The NP and chipset 410 in this embodiment takes (intercepts) an Ethernet Frame before transmitting to the LAN 5 or the WAN 4 and makes the tag conversion unit 417 to process the intercepted Ethernet Frame.

The tag conversion unit 417 converts the tag of an Ethernet Frame for extended VLAN tagged communication in accordance with a conversion table 703 and transfers the Ethernet Frame with the converted tag to the information processing card 100.

The volatile memory 412 is a storage device for temporarily holding Ethernet Frames and storing table information such as a later-described conversion table and a forwarding table. The volatile memory 412 may be a DRAM (Dynamic Random Access Memory) or an SRAM (Static Random Access Memory); in most cases, a DRAM is used because of its high capacity. To the volatile memory 412, a conversion table 703 is loaded from the non-volatile memory 413.

The programs and data stored in the non-volatile memory 413 are loaded by the NP and chipset 410 to the volatile memory 412 as necessary.

The non-volatile memory 413 is a storage device for storing programs, data, configuration information, and the like. The non-volatile memory 413 may be an HDD (Hard Disk Drive), an SSD (Solid State Drive), or a flash memory; in most cases, a flash memory is used because of its inexpensive price, satisfactory durability, and small heat generation. This embodiment is described based on the assumption that the non-volatile memory is a non-volatile semiconductor memory.

The information processing card 100 includes a backplane interface 116, a processor 110, a chipset 111, a volatile memory 112, and a non-volatile memory 113. The backplane interface 116 is an interface for the chipset 111 to connect with the internal switch 300.

The processor 110 is a computing device for executing programs of communication services and may be a CPU.

The chipset 111 is a computing device and includes a tag conversion unit 117. The tag conversion unit 117 has the same function as the tag conversion unit 417 to convert the tags of Ethernet Frames.

The volatile memory 112 is a storage area for temporarily holding Ethernet Frames, storing table information such as a conversion table 703, and for the processor 110 or the chipset 111 to deploy programs by the processor 110 or the chipset 111. The processor 110 runs a plurality of virtual machines and a virtual switch 190 on the volatile memory 112.

The non-volatile memory 113 is a storage area for storing programs, data, configuration information, and the like. The processor 110 and the chipset 111 load the data and the like stored in the non-volatile memory 113 to the volatile memory 112 to execute a program. The non-volatile memory 113 stores virtualization software, which is a program for implementing a virtual environment.

The non-volatile memory 113 stores a boot image 704. The boot image 704 is a program to implement virtual machines in the information processing card 100.

The processor 110 of the information processing card 100 runs virtualization software held in the non-volatile memory 113 to provide multitenancy communication services. As a result, the processor 110 can implement a virtual environment including a plurality of virtual machines and a virtual switch 190 for connecting the virtual machines.

The virtual environment illustrated in FIG. 2 includes four virtual machines (virtual machines 120, 130, 140, and 150) and a virtual switch 190. The virtual machines perform processing like physical computers. The processor 110 runs virtual machines for different communication services in different virtual networks.

The virtual machine 120 includes a guest OS (Operating System) 122 and runs a firewall service program 121 for Company A or a communication service for Company A on the guest OS 122. The virtual machine 120 further includes VNICs (Virtual NICs) 123 and 124. The VNIC 123 is an interface having a communication port for the WAN 4 and the VNIC 124 is an interface having a communication port for the LAN 5.

The virtual machine 130 includes a guest OS 132 and runs a WAN optimization service program 131 for Company A or a communication service for Company A on the guest OS 132. The virtual machine 130 further includes VNICs 133 and 134. The VNIC 133 is an interface having a communication port for the WAN 4 and the VNIC 134 is an interface having a communication port for the LAN 5.

The virtual machine 140 includes a guest OS 142 and runs a WAN optimization service program 141 for Company B or a communication service for Company B on the guest OS 142. The virtual machine 140 further includes VNICs 143 and 144. The VNIC 143 is an interface having a communication port for the WAN 4 and the VNIC 144 is an interface having a communication port for the LAN 5.

The virtual machine 150 includes a guest OS 152 and runs an IDS (Intrusion Detection System) service program 151 for Company B or a communication service for Company B on the guest OS 152. The IDS service program 151 for Company B shown in FIG. 2 detects intrusions only to communications in the WAN 4. Accordingly, the virtual machine 150 includes only a VNIC 153 having a communication port for the WAN 4.

In this embodiment, in the case where a virtual machine provides a communication service involving data transfer, the virtual machine is equipped with two communication ports for the WAN 4 and the LAN 5. Accordingly, such a virtual machine is allocated two VNICs per virtual machine.

The communication service (cloud communication services) involving data transfer may be WAN optimization, firewall, IPS (Intrusion Protection System), session load balancing, or the like.

In the case where a virtual machine provides a communication service involving data receiving only but not involving data transfer, the virtual machine is allocated one VNIC to receive data. The communication service not involving data transfer may be IDS (Intrusion Detection System) service that processes only Ethernet Frames transmitted from the WAN 4 to the LAN 5.

Although not shown in the drawings, the administrator of the telecommunications carrier may allocate each virtual machine a VNIC dedicated to control-purpose communications with virtual machines, in addition to VNICs for data transfer.

When the virtual switch 190 receives an Ethernet Frame from an interface such as a VNIC (123, 124, 133, 134, 143, 144, or 153) or a physical NIC included in the NP and chipset 410 of a transfer card 400, it refers to a forwarding table stored in the volatile memory 112. The virtual switch 190 transfers the Ethernet Frame and adds or deletes a VLAN tag in accordance with the forwarding table.

The control card 200 includes a backplane interface 216, a processor 210, a chipset 211, a volatile memory 212, and a non-volatile memory 213. The backplane interface 216 is an interface for connecting with the internal switch 300.

The chipset 211 includes a computing device and performs transfer of an Ethernet Frame. The processor 210 is a computing device such as a CPU and runs a control program 702.

The volatile memory 212 is a storage area for storing programs, data, tables, and the like. The volatile memory 212 is also a storage area for the processor 210 or the chipset 211 to deploy programs and data retrieved from the non-volatile memory 213. The volatile memory 212 stores a control program 702, a service table 700, and a resource management table 701.

The non-volatile memory 213 is a storage area for storing data, tables, programs, configuration information, and the like.

The management terminal 900 is an apparatus for inputting data to and outputting data from the communication node apparatus 10 via the chipset 211 in the control card 200. The management terminal 900 is an apparatus to instruct the communication node apparatus 10 to activate or deactivate and input a request to add, update, or delete a communication service provided by the communication node apparatus 10 to the communication node apparatus 10.

The management terminal 900 is a user interface including a display, a keyboard, a mouse, and the like. The management terminal 900 may be connected with the communication node apparatus 10 via a network.

The above-mentioned tables (the service table 700, the resource management table 701, and the conversion table 703) held in the communication node apparatus 10 holds information in the format of table. However, the communication node apparatus 10 in this embodiment may employ any format if the information in the tables can be held; for example, the apparatus 10 can hold the information in CSV format.

The tag conversion unit 117 and the tag conversion unit 417 may be implemented as processing units included in the chipsets, otherwise, may be implemented by a program.

Figure 3:
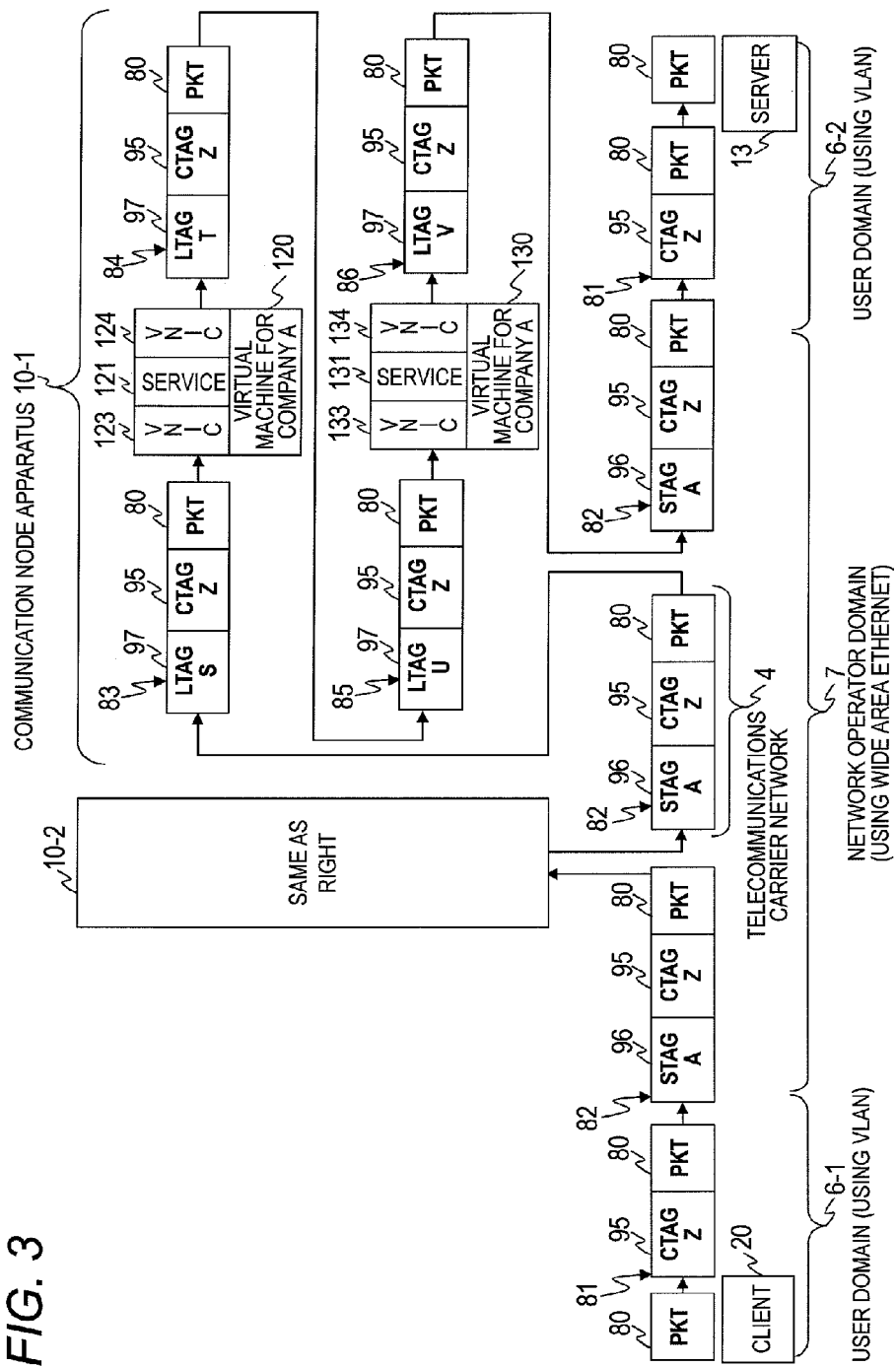
FIG. 3 is an explanatory diagram illustrating transformation of an Ethernet Frame in the wide area Ethernet in the embodiment.

Now, described with FIG. 3 is transmission of an Ethernet Frame in a virtual network in the network system shown in FIG. 1, or the wide area Ethernet using extended VLAN tagging.

FIG. 3 is an explanatory diagram illustrating transformation of an Ethernet Frame in the wide area Ethernet in this embodiment.

FIG. 3 is a diagram schematically illustrating changes of VLAN tags added to an Ethernet Frame in the wide area Ethernet in this embodiment. A network operator domain 7 is defined as the network of the switching office 3, the WAN 4, and the edge switch 11-1 in the data center 1. A user domain 6-1 is defined as the network of the clients 20 and the edge switch 11-2 and a user domain 6-2 is defined as the network of the servers 13 and the edge switch 11-1.

Figure 4:
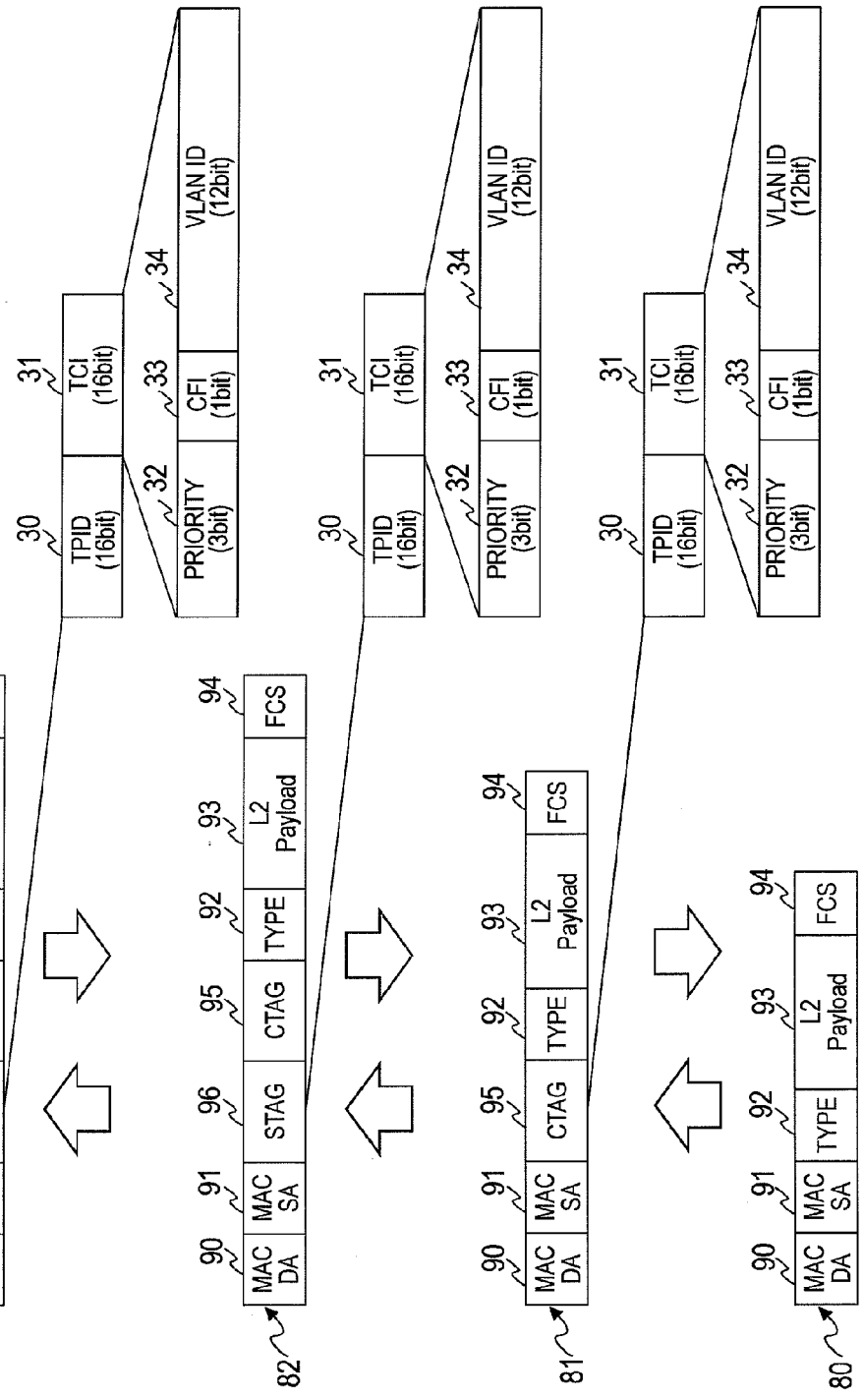
FIG. 4 is an explanatory diagram illustrating formats of an Ethernet Frame in the embodiment.

FIG. 4 is an explanatory diagram illustrating formats of an Ethernet Frame in this embodiment.

The Ethernet Frames transmitted in the network system of this embodiment are in the formats of Ethernet Frame 80, Ethernet Frame 81, Ethernet Frame 82, and Ethernet Frame 83 shown in FIG. 4.

The Ethernet Frame 80 includes a MAC DA (Destination Address) 90, a MAC SA (Source Address) 91, a Type 92, an L2 Payload (Layer 2 Payload) 93, and an FCS (Frame Check Sequence) 94.

The MAC DA 90 contains a MAC address indicating the destination of the Ethernet Frame. The MAC SA 91 contains a MAC address indicating the source of the Ethernet Frame. The Type 92 indicates the type of the L2 Payload or the length of the L2 Payload.

The L2 Payload 93 is a data field of the Ethernet Frame. The FCS 94 stores a value for detecting an error of the frame. In the case of a wide area Ethernet using the extended VLAN tagging, an STAG 96 and a CTAG 95 are inserted between the MAC SA 91 and the Type 92.

In FIG. 1, each client 20 in the site 2-1 of Company A communicates with one of the servers 13 (servers 13-1 to 13-3) via a different virtual network. For a specific example, the client 20-1 and the server 13-1 in FIG. 1 belong to the same VLAN in Company A. Described hereinafter is a case where the client 20-1 communicates with the server 13-1.

First, the client 20-1 sends an Ethernet Frame 80 toward the server 13-1. The LAN switch 21-1 of Company A inserts a VLAN tag including an identifier uniquely identifying the VLAN between the client 20-1 and the server 13-1 into the Ethernet Frame 80 to create an Ethernet Frame 81 shown in FIG. 4. This VLAN tag is called CTAG.

The VLAN tag of the Ethernet*Frame 81 is the CTAG 95 in the Ethernet Frame 81 in FIG. 3. The LAN switch 21-1 of Company A sends the created Ethernet Frame 81 to the switching office 3.

In the wide area Ethernet, the VLAN tag inserted by the switch in the site (in the foregoing description, the LAN switch 21-1 of Company A) is called CTAG. The LAN switch 21-1 of Company A inserts a CTAG 95 between the MAC SA 91 and the Type 92 of the Ethernet Frame 80 as shown in FIG. 4.

The VLAN tag (CTAG) consists of a 16-bit TPID (Tag Protocol IDentifier) 30 and a 16-bit TCI (Tag Control Identifier) 31. The TCI 31 consists of a 3-bit PRIORITY 32, a 1-bit CFI 33, and a 12-bit VID (VLAN IDentifier) 34 as shown in FIG. 4.

The TPID 30 contains an identifier (for example, 0x8100) identifying the tag including this TPID 30 as a VLAN tag. That is to say, the TPID 30 in the CTAG 95 identifies the tag as a CTAG.

The VID 34 identifies the VLAN number (virtual network number) of the VLAN via which the Ethernet Frame 81 including this VID 34 is transmitted. In general, VID=0 and VID=4095 have been reserved; the VID 34 contains one of the 4094 identifiers for VLANs. The example of the CTAG 95 in FIG. 3 shows the VID 34 as "Z".

Upon receipt of the Ethernet Frame 81 from the site 2-1 of Company A at the switching office 3, the edge switch 11-2 inserts a VLAN tag (STAG 96) for identifying the tenant as Company A or Company B to the Ethernet Frame 81. Through this operation, the Ethernet Frame 82 shown in FIG. 4 is created. The Ethernet Frame 82 in FIG. 3 shows the VLAN tags of the Ethernet Frame 82. The edge switch 11-2 sends the created Ethernet Frame 82 to the WAN 4 via the communication node apparatus 10-2.

In the wide area Ethernet, the VLAN tag inserted at the switching office 3 is called STAG. The edge switch 11-2 inserts an STAG 96 between the MAC SA 91 and the CTAG 95 of the Ethernet Frame 81 as shown in FIG. 4.

The STAG 96 consists of a 16-bit TPID 30 and a 16-bit TCI 31, like the foregoing CTAG 95. The TPID 30 of the STAG 96 is a value identifying the VLAN tag as an STAG, which is 0x88a8 according to IEEE 802.1ad. The TPID 30 of the STAG 96 may contain 0x9100, 0x9200, or 0x9300 depending on the vendor. The example of STAG 96 shown in FIG. 3 shows the VID 34 as "A".

In the following description, the value of an STAG means the value of the VID 34 of an STAG 96.

When the data center 1 receives the Ethernet Frame 82 via the WAN 4, the communication node apparatus 10-1 transfers the received Ethernet Frame 82 to the edge switch 11-1 if the telecommunications carrier does not provide a communication service to the tenant of the destination of the Ethernet Frame 82.

In the meanwhile, the processing of the communication node apparatus 10 in the case where, when the data center 1 receives an Ethernet Frame 82 via the WAN 4, the telecommunications carrier provides a cloud communication service to the tenant of the destination of the Ethernet Frame 82 will be described later.

Upon receipt of the Ethernet Frame 82, the edge switch 11-1 refers to the STAG 96 to identify the tenant (client) as Company A or Company B, which is the tenant to send the Ethernet Frame 82. Next, the edge switch 11-1 deletes the STAG 96 from the Ethernet Frame 82 to create the Ethernet Frame 81 shown in FIG. 4. Then, the edge switch 11-1 sends the created Ethernet Frame 81 to the LAN switch 12 of the tenant (client) identified by the STAG 96.

Upon receipt of the Ethernet Frame 81 from the edge switch 11-1, the LAN switch 12-1 identifies the virtual network by the CTAG 95. Next, the LAN switch 12-1 deletes the CTAG 95 to create the Ethernet Frame 80 shown in FIG. 4. Then, the LAN switch 12-1 sends the created Ethernet Frame 80 to the server 13-1 of Company A associated with the virtual network identified by the CTAG 95.

In this way, the apparatuses (the LAN switch 21, the LAN switch 12, and the edge switches 11-1 and 11-2) required to distinguish tenants (clients) or virtual networks in some tenant add and delete a CTAG 95 and an STAG 96 to distinguish tenants or virtual networks in some tenant, enabling communication in the wide area Ethernet.

Next, described is the processing of the communication node apparatus 10-1 in the case where, when the data center 1 receives an Ethernet Frame 82 via the WAN 4, the telecommunications carrier provides a cloud communication service to the tenant of the destination of the Ethernet Frame 82.

If the communication node apparatus 10-1 executes a cloud communication service for a tenant on a received Ethernet Frame, it performs tag conversion on the Ethernet Frame 82 and executes the communication service for the tenant on the Ethernet Frame with the converted tag.

The communication node apparatus 10-1 adds an identifier uniquely identifying a combination of the communication service to be executed by a virtual machine and the communication port of the virtual machine to the Ethernet Frame in order to properly send the Ethernet Frame to the communication port (VNIC 123 or VNIC 133) of the virtual machine.

Specifically, the communication node apparatus 10-1 shown in FIGS. 2 and 3 has four identifiers: an identifier for the combination of the firewall service program 121 for Company A and the VNIC 123, an identifier for the combination of the firewall service program 121 for Company A and the VNIC 124, an identifier for the combination of the WAN optimization service program 131 for Company A and the VNIC 133, and an identifier for the combination of the WAN optimization service program 131 for Company A and the VNIC 134.

In this embodiment, the tags containing these identifiers in the communication node apparatus 10 are called LTAGs (Local TAGs), which are shown as LTAGs 97 in FIG. 3. An LTAG 97 includes an identifier which is common to neither different communication services nor communication ports. To provide a series of communication services to an Ethernet Frame in each virtual network, the communication node apparatus 10 has a conversion table 703 to convert an STAG 96 into an LTAG 97.

The format of an Ethernet Frame including an LTAG 97 is illustrated as the Ethernet Frame 83 in FIG. 4. The Ethernet Frame 83 has a format in which the STAG 96 of the Ethernet Frame 82 has been converted to (replaced by) the LTAG 97. The LTAG 97 has the same format as a normal VLAN tag, having fields of a TPID 30 and a TCI 31. The communication node apparatuses 10 and the internal switch 300 and the virtual switch 190 in the communication node apparatus 10 can transfer Ethernet Frames including LTAGs 97 without introducing a special technology to any of the communication node apparatus 10 and the internal switch 300 and the virtual switch 190 since the LTAG 97 has the same format as the VLAN tag.

In the following description, the value of an LTAG means the value of the VID 34 of an LTAG 97.

The value of the TPID 30 of the LTAG 97 is predetermined by the system at least to be different from the value of the TPID 30 of the STAG 96 in order to distinguish between the LTAG 97 and the STAG 96.

The value of the TPID 30 of the LTAG 97 is determined to be also different from the value of the TPID used for standard protocols such as IPv4 (TPID=0x0800), IPv6 (TPID=0x86DD), and ARP (TPID=0x0806). Hence, the value of the TPID 30 of the LTAG 97 may be determined to be any value other than the traditionally specified TPID values. For example, the value of the TPID 30 of the LTAG 97 may be TPID=0x8100, 0x9100 or 0x9200 unless used for the STAG 96, or any special value determined by the system.

The communication node apparatus 10 in this embodiment intercepts Ethernet Frames 82 for extended VLAN tagged communication during transmission of Ethernet Frames in the virtual networks. The communication node apparatus 10 applies tag conversion to each intercepted Ethernet Frame 82 and makes a virtual machine to execute a communication service to the Ethernet Frame in which the tag has been converted, providing the communication service to a tenant.

In tag conversion, the communication node apparatus 10 converts (replaces) the STAG 96 of the intercepted Ethernet Frame 82 into (with) an LTAG 97 with reference to the above-mentioned conversion table 703 and then sends the Ethernet Frame to the virtual switch 190.

When the virtual switch 190 of a communication node apparatus 10 receives an Ethernet Frame, the virtual switch 190 that has received the Ethernet Frame transfers the Ethernet Frame to the communication port (VNIC) of the virtual machine represented by the LTAG 97 of the Ethernet Frame. When transferring the Ethernet Frame to the communication port, the virtual switch 190 deletes the LTAG 97 of the Ethernet Frame.

After a virtual machine 120 executes a communication service to the Ethernet Frame, the communication port (VNIC) of the virtual machine 120 outputs the Ethernet Frame. The virtual switch 190 adds an LTAG 97 representing the executed communication service and the communication port that has outputted the Ethernet Frame to the Ethernet Frame output from the virtual machine.

When the transfer card 400 receives the Ethernet Frame on which the communication service has been executed by a virtual machine, the transfer card 400 converts the LTAG 97 of the Ethernet Frame into an STAG based on the conversion table. Through this operation, the communication node apparatus 10 converts the Ethernet Frame processed by a virtual machine 120 into the Ethernet Frame 82 and sends the Ethernet Frame 82 to the destination thereof.

Through the foregoing process, the communication node apparatus 10 can transfer an intercepted Ethernet Frame to the communication port of the virtual machine to execute the communication service to process the Ethernet Frame. Hence, the communication node apparatus 10 can coordinate the virtual network with the communication service.

Now, a specific example of tag conversion is described with FIG. 3. The conversion table 703 in this example specifies the followings.

The conversion table 703 in the example shown by FIG. 3 specifies that the VNIC 123 is assigned an LTAG 97 containing "S" in the VID 34 and the VNIC 124 is assigned an LTAG 97 containing "T" in the VID 34. Furthermore, the conversion table 703 specifies that the VNIC 133 is assigned an LTAG 97 containing "U" in the VID 34 and the VNIC 134 is assigned an LTAG 97 containing "V" in the VID 34. Still further, the conversion table 703 specifies, if an Ethernet Frame 82 received from the WAN includes an STAG 96 containing "A" in the VID 34, the STAG 96 is to be converted to an LTAG 97 containing "S" in the VID 34.

Such conversion table 703 including the foregoing values indicates that, if the STAG 96 of an intercepted Ethernet Frame 82 being transmitted from the WAN to the LAN indicates "A", the intercepted Ethernet Frame receives communication services of the firewall service program 121 for Company A and the WAN optimization service program 131 for Company A in this order.

According to the above-described conversion table 703, the communication node apparatus 10-1 shown in FIG. 3 creates an Ethernet Frame 83 in which the STAG 96 of the Ethernet Frame 82 has been converted to an LTAG 97 containing "S" in the VID 34. The Ethernet Frame 83 is transmitted to the virtual machine 120 in accordance with the value of the LTAG 97 and the virtual machine 120 executes the firewall service program 121 on the Ethernet Frame 83.

Subsequently, the virtual switch 190 outputs an Ethernet Frame 84 in which the LTAG of the Ethernet Frame 83 has been replaced by an LTAG containing "T" in the VID 34. The value of the VID 34 of the LTAG 97 of the output Ethernet Frame 84 is converted from "T" to "U" based on the conversion table 703. Through this operation, an Ethernet Frame 85 is created.

The Ethernet Frame 85 is transferred to the VNIC 133 assigned "U" for the VID 34. After the Ethernet Frame 85 is input to the VNIC 133 of the virtual machine 130 and the virtual machine 130 executes the WAN optimization service program 131 for Company A on the contents of the Ethernet Frame 85, the virtual machine 130 outputs an Ethernet Frame 86 in which the LTAG of the Ethernet Frame 85 has been replaced by an LTAG containing "V" in the VID 34. Then, by converting the LTAG 97 to an STAG 96, the Ethernet Frame 86 is converted to the Ethernet Frame 82 for the extended VLAN tagged communication before being intercepted.

Subsequently, the communication node apparatus 10-1 sends the Ethernet Frame 82 to the edge switch 11 (user domain 6-2) of the original destination. Through the processing described above, the communication node apparatus 10-1 provides the tenant of the destination of the Ethernet Frame 82 with communication services.

In the case where an Ethernet Frame 82 is sent from the user domain 6-2 to the network operator domain 7, the communication node apparatus 10-1 performs the processing in the direction reverse to the above-described conversion. In the case where an Ethernet Frame 82 is sent from the network operator domain 7 to the user domain 6-1, the communication node apparatus 10-2 performs the processing in the direction same as the above-described conversion.

In the case where an Ethernet Frame 82 is sent from the user domain 6-1 to the network operator domain 7, the communication node apparatus 10-2 performs the processing in the direction reverse to the above-described conversion. In other words, the communication node apparatus 10-1 and the communication node apparatus 10-2 have the same functions.

For the communications in the other VLANs (virtual networks) in Company A and the communications in the VLANs (virtual networks) in Company B, the same processing as the above-described conversion is performed.

Figure 5:
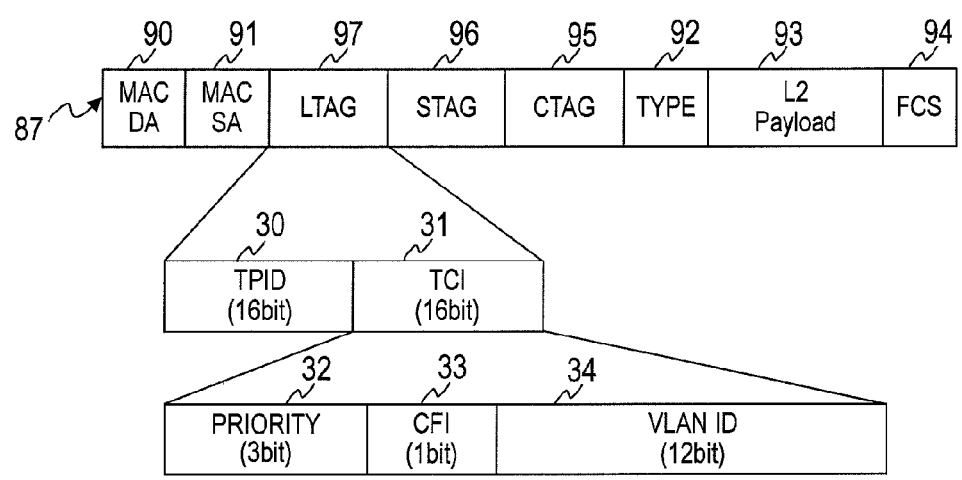
FIG. 5 is an explanatory diagram illustrating an example of an Ethernet Frame in the embodiment.

The foregoing description about the conversion is based on an example where an STAG 96 is converted to (replaced by) an LTAG 97; however, the LTAG 97 may be added on the outer side of the STAG 96 as shown in FIG. 5.

FIG. 5 is an explanatory diagram illustrating an example of an Ethernet Frame 87 in this embodiment.

The communication node apparatus 10 may create an Ethernet Frame 87 by inserting an LTAG 97 to an Ethernet Frame 82 in the tag conversion. In this case, the conversion table 703 includes information specifying, if the extended VLAN tag begins with an STAG 96, an LTAG 97 should be added before the STAG 96 or, if the extended VLAN tag begins with an LTAG 97, the LTAG 97 should be replaced by another LTAG 97 or deleted.

FIG. 6 is an explanatory diagram illustrating the service table 700 in this embodiment.

The service table 700 in the control card 200 is a table to manage the communication services to be applied to each virtual network and the resources (such as virtual machines) in the communication node apparatus 10 to be used for the communication services. The service table 700 includes fields 725 for which the administrator of the telecommunications carrier determines the values in accordance with contracts with tenants and fields 726 for which the control program 702 determines the values.

The service table 700 includes tenants 710, bandwidths 711, services 712, service qualities (delay sensitivities) 713, allocated CPU cores 714, and allocated memories 715 for the fields 725 for which the administrator determines the values.

Each tenant 710 includes an identifier for uniquely identifying a tenant. The tenant 710 may include the name of the tenant. Each bandwidth 711 indicates the communication bandwidth contracted by the tenant.

Each service 712 indicates a communication service used by the tenant. Each service quality 713 indicates the service quality demanded by the tenant. The service quality 713 in FIG. 6 includes a value indicating what extent the delay can be accepted.

Each allocated CPU core 714 indicates the manner of allocation of processor cores or threads to execute the communication service and the number of processor cores or threads. Each allocated memory 715 indicates the size of the memory allocated to the communication service.

The service table 700 further includes STAGs 716, LTAGs 717, ports 718, apparatus numbers 719, information processing card numbers 720, virtual machine numbers 721, and VNIC information 722 for the fields 726 for which the values are determined by the control program 702.

Each STAG 716 includes the STAG identifier (represented by the value of the VID 34 of the STAG 96) assigned to the tenant. For example, the value of the STAG 716 includes the value of the STAG 96 to be used to identify the tenant at the edge switch 11 shown in FIG. 1.

Each LTAG 717 includes the identifier (represented by the value of the VID 34 of the LTAG 97) assigned to the combination of a communication service and a communication port (VNIC).

Each port 718 indicates the communication port of the VNIC assigned to the value of the LTAG 717. The port 718 in FIG. 6 contains a value indicating whether the VNIC is connected to the WAN 4 or the LAN 5.

Each apparatus number 719 includes the identifier of the communication node apparatus 10. Since the example of FIG. 6 is based on an assumption that only one communication node apparatus 10 is used, the apparatus numbers 719 show only one identifier; however, if a number N of communication node apparatuses 10 are used, identifiers of 1 to N are used.

Each information processing card number includes the identifier of the information processing card 100 including the virtual machine for providing the communication service to the tenant. Since the example of FIG. 6 is based on an assumption that only one information processing card number 720 is used, the information processing card numbers 720 show only one identifier, however, if a number N of information processing cards 100 are used, identifiers of 1 to N are used. Each VM number 721 includes the identifier of the virtual machine for providing the communication service to the tenant.

Each piece of VNIC information 722 includes information indicating the identification number, the virtual MAC address, the VLAN mode, the VID (VLAN number), and the virtual IP address for a guest OS, and the like, of the VNIC.

The VLAN mode in the VNIC information 722 is a value indicating whether to employ VLAN tagging. The VLAN number in the VNIC information 722 indicates the VID to use the VNIC as a port for a VLAN tag.

The information processing card 100 in this embodiment uses the VNICs in the VLAN mode. In the VLAN mode, a VNIC is uniquely associated with the identifier of a VLAN tag. Accordingly, the control program 702 in this embodiment can uniquely associate the values of VIDs 34 in the fields of LTAGs 717 in the service table 700 with the identifiers identifying the VNICs by making the VLAN numbers for the VNICs common to the VIDs 34 of the LTAGs.

This configuration allows the internal switch 300 and the virtual switch 190 to discriminate Ethernet Frames by VLAN number and the processing unit for identifying the destinations of Ethernet Frames refers to the LTAG 97 of an Ethernet Frame to send the Ethernet Frame to the VNIC represented by the VID 34 of the LTAG 97. In similar, the internal switch 300 and the virtual switch 190 refers to the LTAG 97 of an Ethernet Frame to send the Ethernet Frame to the virtual machine via the VNIC indicated by the VNIC information 722, so that the Ethernet Frame can be processed by the communication service running on the guest OS.

The service table 700 does not need to hold values specifying that the same communication service is to be applied within the same tenant. For example, the service table 700 may hold different numbers or different kinds of communication services for different departments or users. In such cases, the service table 700 may hold CTAGs, source IP addresses, destination IP addresses, source ports, destination ports, and protocols as a part of the identifiers of communications in the tenant, in addition to the STAG 716 in FIG. 6. The CTAG is a value of the VID 34 of a CTAG 95 which is the identifier for identifying a C-VLAN used in the tenant.

In a common method, the processor 110 of the information processing card 100 can identify which user of which tenant sent the received Ethernet Frame using the communication service programs and determine which communication service is to be applied to the Ethernet Frame in accordance with the result of the identification. This method, however, may lead the transfer card 400 to send Ethernet Frames to communication service programs unnecessary to be sent, causing heavy load to the communication service programs.

However, the tag conversion unit 417 in the transfer card 400 in this embodiment adds information specifying which communication service should be applied to an Ethernet Frame with reference to the conversion table 703 created based on the service table 700. Accordingly, the transfer card 400 is required to transfer only minimum Ethernet Frames to the virtual machines to execute communication services on the processor 110. This configuration causes lower load to the virtual machines.

FIG. 7 is an explanatory diagram illustrating the resource management table 701 in this embodiment.

The resource management table 701 in the control card 200 includes fields for managing the amount of physical resources to be used in the communication node apparatus 10, fields for managing the amount of unallocated resources (the remaining amount after allocation), and fields for managing the VIDs 34 of the LTAGs 97 assigned to the VNICs.

The resource management table 701 includes information processing card numbers 740, numbers of mounted cores (the number of mounted threads) 741, amounts of mounted memories 742, numbers of allocated dedicated cores 743, numbers of allocated shared cores 744, and amounts of allocated memories 745 for the fields for managing resources.

Each information processing card number 740 contains the identifier of an information processing card 100. Each number of mounted cores 741 indicates the number of processor cores or threads the processor 110 of the information processing card 100 has for allocation to virtual machines.

Each amount of mounted memory 742 indicates the size of the storage area the volatile memory 112 of the information processing card 100 has for allocation to virtual machines.

Each number of allocated dedicated cores 743 indicates the number of processor cores or threads which have already been allocated to virtual machines dedicatedly. Each number of allocated shared cores 744 indicates the number of processor cores or threads which have already been allocated to virtual machines for sharing (in a shared state). Each amount of allocated memory 745 indicates the size of the storage area allocated to virtual machines.

Accordingly, the value obtained by subtracting the sum of the value of the number of allocated dedicated cores 743 and the value of the number of allocated shared cores 744 from the number of mounted cores 741 is the amount of remaining processor cores (or threads). In similar, the value obtained by subtracting the value of the amount of allocated memory 745 from the amount of mounted memory 742 is the amount of remaining memory.

The resource management table 701 further includes communication node apparatus numbers 750, unused LTAGs 751, and the numbers of unused LTAGs 752 for the fields for managing the VIDs 34 of the LTAGs 97 assigned to the VNICs. Each communication node apparatus number 750 is an identifier uniquely identifying a communication node apparatus 10.

Each unused LTAG 751 holds the values of unassigned VIDs 34 among the candidate VIDs 34 of LTAGs 97 held by the communication node apparatus number 750. Each number of unused LTAGs 752 indicates the number of unassigned candidate VIDs 34 of LTAGs 97 (or the number of remaining LTAGs).

To perform the tag conversion illustrated in FIG. 3, the control program 702 is required to allocate two or more LTAGs for an STAG. Accordingly, if the total number of LTAGs is equal to the number of STAGs (for example, about 4,000), the LTAGs to be allocated to all patterns of STAGs is short.

However, considering the amount of physical resources included in a single communication node apparatus 10, it is sufficient in most cases if a communication node apparatus 10 has the same number of LTAGs as the STAGs (for example, about 4,000). For example, if the resource management table 701 stores four times as many LTAGs as the STAGs, the table 701 is more likely to hold useless candidate VIDs 34 of LTAGs 97.

Accordingly, it is sufficient for the control program 702 in this embodiment to assign LTAGs for all the STAGs if each communication node apparatus 10 stores a resource management table 701 containing the same number, for example, about 4,000, of candidate VIDs 34 of LTAGs 97 as STAGs 96.

It should be noted that a plurality of information processing cards 100 included in one communication node apparatus 10 may be divided into at least one block and the resource management table 701 may hold the same number, for example, about 4,000, of candidate VIDs 34 of LTAGs 97 as the STAGs for each block.

The communication node apparatus 10 in this embodiment may have a plurality of information processing cards 100 or may be interconnected with a plurality of other communication node apparatuses 10. These configurations allow the administrator to easily increase or decrease information processing cards 100 to execute virtual machines.

FIG. 8 is an explanatory diagram illustrating the conversion table 703 in this embodiment.

The conversion table 703 is created based on the information of the service table 700 to specify the order of applying communication services, the values for LTAGs and STAGs to be converted to and from each other, the values indicating the VNICs to transfer Ethernet Frames (or the values of LTAGs), and the kinds of communication services. The conversion table 703 is stored in the volatile memory 412 and the volatile memory 112 by the control program 702, so that the tag conversion unit 417 in the transfer card 400 and the tag conversion unit 117 in the information processing card 100 can perform tag conversion on Ethernet Frames.

The conversion table 703 includes IN TAGs 40 and IN PORTs 41 for fields to identify a received Ethernet Frame. The conversion table 703 further includes OUT TAGs 50, OUT PORTs 51, and SERVICEs 52.

Each IN TAG 40 includes a value (values for the TPID 30 and the VID 34) identifying the most anterior tag among the tags added to an Ethernet Frame for extended VLAN tagged communication.

Each IN PORT 41 identifies the input source of an Ethernet Frame. In the conversion table 703 shown in FIG. 8, "WAN" represents the WAN 4, "LAN" represents the LAN 5, and "CARD" represents the information processing card 100.

When an Ethernet Frame identified by the IN TAG 40 is input from the input source identified by the IN PORT 41, the tag conversion unit 417 or the tag conversion unit 117 converts the tag of the Ethernet Frame into the one specified by the OUT TAG 50 and outputs the Ethernet Frame to the output destination specified by the OUT PORT 51. Through this operation, the tag conversion unit 417 or the tag conversion unit 117 makes the Ethernet Frame receive the communication service indicated by the SERVICE 52.

An entry of the conversion table 703 which contains "NONE" in the SERVICE 52 indicates that the tag conversion unit 417 outputs the Ethernet Frame from the communication node apparatus 10 without applying a communication service.

The conversion table 703 in FIG. 8 includes tag conversion rules 60 for Company A (Tenant A) and tag conversion rules 61 for Company B (Tenant B). The table 703 also includes entries 762 to 766.

For example, when an Ethernet Frame in which the STAG 96 includes a VID 34 of 0x000A is input from a communication port connected to the WAN 4, the tag conversion unit 417 converts the STAG 96 of the Ethernet Frame into an LTAG including a VID 34 of 0x001A in accordance with the entry 762 of the conversion table 703.

Subsequently, the tag conversion unit 417 transfers the Ethernet Frame with the converted tag for the output destination indicated by CARD #1, instead of the original destination in the extended VLAN tagged communication. The information processing card 100 to receive the Ethernet Frame provides the communication service of firewall (FW).

In a modification, the conversion table 703 does not need to store values of communication services for each tenant but may store a different number or different kind of communication services for each department or user to use the services. In these cases, the conversion table 703 may contain a value indicating CTAG, a source IP address, a destination IP address, a source port, a destination port, or a protocol other than the STAG or LTAG in a field of IN TAG 40. Further, the conversion table 703 may contain a value indicating LTAG in the OUT TAG 50 of entries in which IN TAG 40 includes CTAG or other value.

Such a modified conversion table 703 enables the telecommunications carrier to provide the firewall service and the WAN optimization service to the communications of a specific VLAN in Company A (Tenant A) and to provide only the firewall service to the communications of the other VLANs in Company A.

Figure 9:
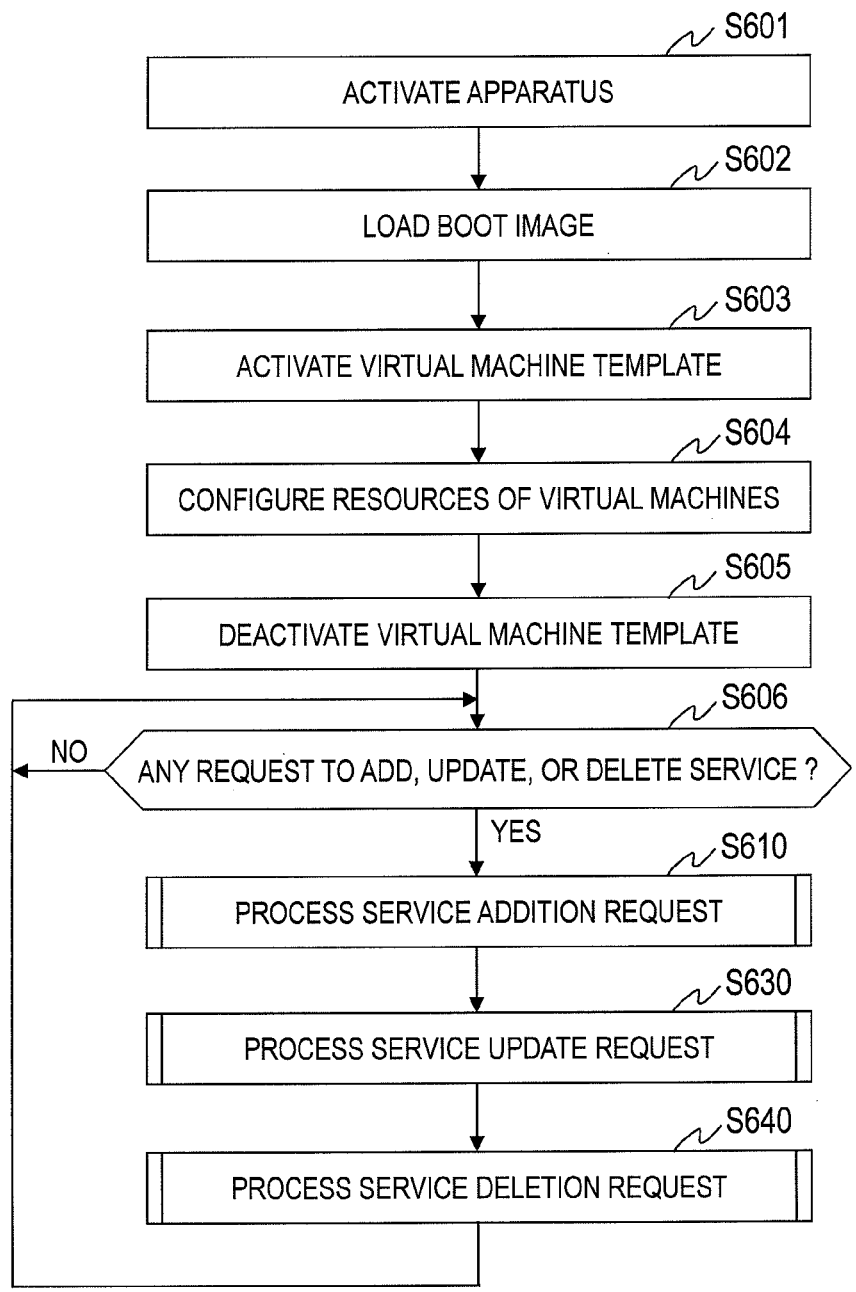
FIG. 9 is a flowchart illustrating adding, updating, or deleting a communication service in the embodiment.

FIG. 9 is a flowchart illustrating adding, updating, or deleting a communication service in this embodiment.

Upon receipt of a request to add, update, or delete a communication service from an administrator of the telecommunications carrier via the management terminal 900, the control program 702 updates the service table 700 and the conversion table 703. FIG. 9 illustrates processing of, after activating a communication node apparatus 10, adding a communication service to the communication node apparatus 10, updating the communication service, and deleting the communication service from the communication node apparatus 10.

The administrator of the telecommunications carrier activates the communication node apparatus 10 using the management terminal 900 located at the external of the communication node apparatus 10. Upon activation of the communication node apparatus 10 (S601), the control program 702 in the control card 200 instructs the processor 110 of the information processing card 100 to load the boot image 704 from the non-volatile memory 113 to the volatile memory 112 (S602).

It should be noted that, at S602, the virtual machines 120, 130, 140, and 150, and the virtual switch 190 have not been implemented in the information processing card 100.

Figure 10:
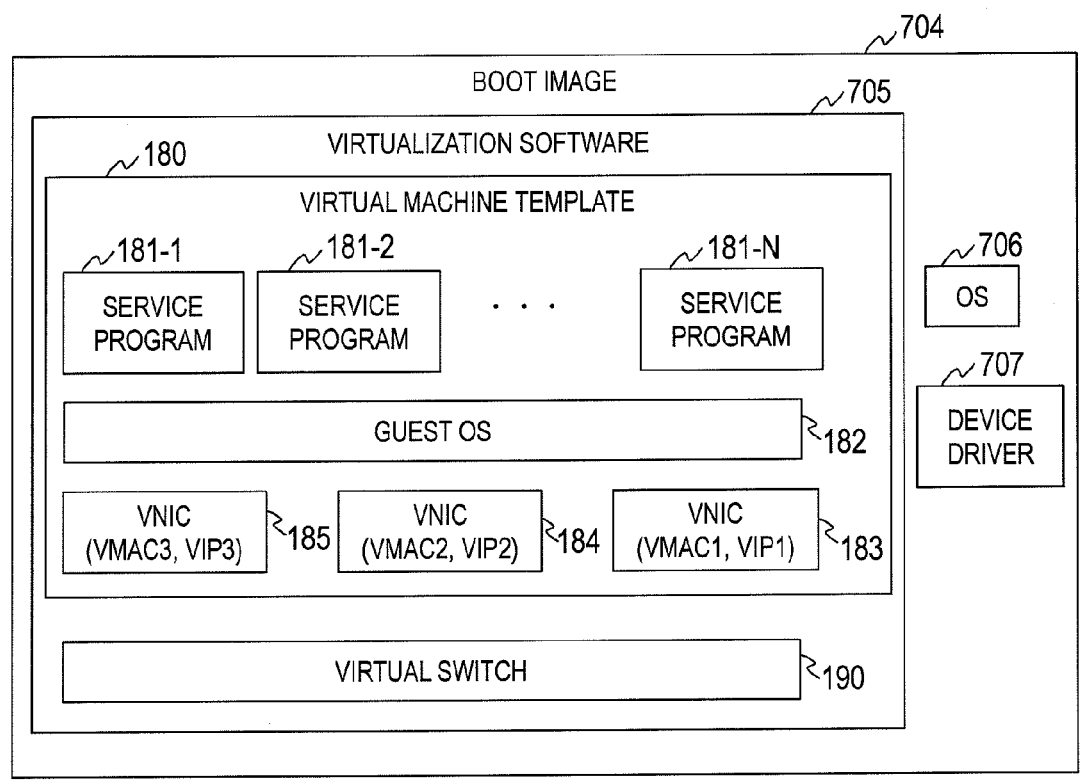
FIG. 10 is a block diagram illustrating a boot image in the embodiment.

FIG. 10 is a block diagram illustrating the boot image 704 in this embodiment.

The boot image 704 is a program for implementing a virtual machine and a virtual switch in the information processing card 100.

The non-volatile memory 113 in this embodiment initially includes the boot image 704. However, the non-volatile memory 113 may store the boot image 704 transmitted from a system, such as the management terminal 900, connected with the communication node apparatus 10.

Alternatively, the administrator makes the communication node apparatus 10 recognize a storage medium (such as a flash memory or an SD card) storing the boot image 704 and transfer the boot image 704 from the recognized storage medium to the non-volatile memory 113. Alternatively, the communication node apparatus 10 may use the recognized storage medium as the non-volatile memory 113.

The boot image 704 includes virtualization software 705, an OS 706, and a device driver 707.

The OS 706 is an operating system for making physical devices such as the processor 110 and the chipset 111 of the information processing card 100 execute processing of the virtualization software 705 to implement a virtual machine and others. The device driver 707 is a device driver for the virtual machine implemented by the virtualization software 705 to use the devices such as the volatile memory 112 and the network interfaces in order to execute a communication service.

The virtualization software 705 is a program to implement a virtual machine and a virtual switch in the information processing card 100. The virtualization software 705 includes a virtual switch 190 and a virtual machine template 180.

The virtual machine template 180 includes a program for implementing a virtual machine. However, the virtual machine template 180 does not include a program for directly implementing individual virtual machines configured for different tenants, such as the virtual machines 120, 130, 140, and 150, but includes a service program for communication service commonly used to implement the virtual machines.

The virtual machine template 180 includes at least one service program 181, a guest OS 182, and VNICs 183, 184, and 185. The virtual machine template 180 shown in FIG. 10 includes service programs 181-1 to 181-N (N is any positive number).

The service program 181 is an application program to execute a communication service. For example, the service program 181 may be a program to execute one of the communication services such as firewall service, WAN optimization service, and IDS service.

The guest OS 182 is an operating system to make physical devices such as the processor 110 and the chipset 111 of the information processing card 100 execute processing of a virtual machine.

The VNIC 185 is a program to implement a control virtual network interface. The VNICs 183 and 184 are programs to implement a communication service virtual network interface.

The communication service virtual network interface is a virtual network interface for inputting an Ethernet Frame sent from the virtual switch to a service program providing a communication service and transferring an Ethernet Frame output from the service program providing a communication service to the virtual switch. The communication service virtual network interfaces in FIG. 10 correspond to VNICs 123, 124, 133, 134, 143, 144, and 153 shown in FIG. 2.

Accordingly, for example, the VNIC 183 may be initially configured as a virtual network interface with the LAN 5 and the VNIC 184 may be initially configured as a virtual network interface with the WAN 4. In addition, the administrator may initially configure the VNICs 183 and 184 as virtual network interfaces for bidirectional communications.

Alternatively, to implement a communication service to be executed on only one-way communications (such as only communications in the direction from the WAN 4 to the LAN 5), the administrator may initially configure the VNICs 183 and 184 as virtual network interfaces for one-way communication services.

Since the virtual machine implemented in this embodiment distributes outputs from the virtual machine in accordance with the attribute indicated by the header of the processed Ethernet Frame, it may include three or more virtual network interfaces.

Here is described an operation applied to Tenant A by way of example. It is assumed that Ethernet Frames to be sent to the users belonging to the design department are provided with the firewall service and then provided with the WAN optimization service and Ethernet Frames to be sent to the users of the other departments are provided with only the firewall service and are not provided with communication services other than the firewall.

In this operation, the virtual machine for providing the firewall service for Tenant A includes three communication service virtual network interfaces. Specifically, the virtual machine that executes the firewall service for Tenant A under this operation may include a VNIC 184 of a communication service virtual network interface with the WAN 4 and two VNICs 183 of communication service virtual network interfaces with the LAN 5. The firewall service for Tenant A under this operation may be configured to determine the VNIC to output depending on the destination user.

Such configuration of the virtual network interfaces depending on the attribute of the header of the Ethernet Frame is executed in the processing in response to a request for addition of communication service (later-described S615 in FIG. 11).

The control virtual network interface is an interface for the administrator to change the configuration of the guest OS and the service program for communication service included in the virtual machine after implementation of the virtual machine. Accordingly, one virtual machine usually includes one control virtual network interface. However, if a communication service virtual network interface can be used to change the configuration of the virtual machine, the virtual machine does not need to include the control virtual network interface.

The virtual machines 120, 130, 140, and 150 in FIG. 2 does not show control virtual network interfaces.

The virtual machine template 180 of the boot image 704 does not include programs configured for individual tenants to provide tenant-specific communication services. Accordingly, the volume of the boot image 704 in this embodiment is smaller than the volume of the boot image including the programs configured for individual tenants. Consequently, the boot image 704 in this embodiment can be stored in the non-volatile memory 113.

After loading the boot image 704 to the volatile memory 112 at S602, the control program 702 starts the virtualization software 705. This operation invokes the virtual machine template 180 and the virtual switch 190 (S603).

After S603, the control program 702 allocates the resources of the information processing card 100 to the invoked virtual machine template 180 and the virtual switch 190 (S604). The resources allocated at this step are the minimum resources required for the virtual machine.

Specifically, at S604, the control program 702 allocates minimum memory and processor cores required to activate the virtual machine template 180 as a virtual machine to the virtual machine template 180 and the virtual switch 190. The control program 702 further assigns minimum required virtual MAC addresses, virtual IP addresses, and parameters related to the networks including VLANs to the VNICs 183 to 185 and the virtual switch 190.

At S604, the VNICs 183 and 184 are configured as communication service virtual network interfaces and the VNIC 185 is configured as a control virtual network interface.

The control program 702 may allocate the resources in accordance with the details of the service program 181 at S604. For example, in the case where the virtual machine template 180 includes the service program 181 for the WAN optimization service, the control program 702 may set a minimum number of sessions to the virtual machine template 180. In another case where the virtual machine template 180 includes the service program 181 for the firewall service, the control program 702 may set minimum requirements for e-mails to be blocked by the firewall.

The control program 702 does not need to allocate all the resources to the virtual machine template 180 and the virtual switch 190 at S604 if it allocates sufficient resources to the virtual machine template 180 in response to the later-described request for addition of communication service. However, the control program 702 sets minimum parameters necessary to communicate between the virtual machine template 180 and the virtual switch 190 at S604.

The processing at S604 enables the control program 702 to replicate the virtual machine template having the same configuration upon receipt of a request for addition of communication service. The control program 702 can configure the replicated virtual machine template as a virtual machine with a lower load.

Since the original virtual machine template has been configured with the virtual network interfaces at S604, all the replicated plurality of virtual machine templates 180 are configured with the same network information. Accordingly, after a virtual machine template 180 is stopped (deactivated) at later-described S605, the control program 702 can communicate with all the replicated virtual machine templates 180.

After S604, the control program 702 deactivates the virtual machine template 180 (S605). The deactivated virtual machine template 180 in this embodiment means that the virtual machine template 180 does not provide a communication service. More specifically, the deactivated virtual machine template 180 means that the virtual machine template 180 is stopped running.

After S605, the control program 702 determines whether any communication service related request requesting addition, update, or deletion of a communication service is input from the management terminal 900 (S606). If the control program 702 does not receive a communication service related request, it stands by until receipt of a communication service related request by repeating S606 at predetermined sufficiently short intervals.

While S606 is repeated, the volatile memory 112 retains the deactivated virtual machine template 180. This is because the control program 702 can quickly replicate the virtual machine template 180 held in the volatile memory 112 upon receipt of a communication service related request to provide the tenant with a new communication service.

The amount of memory for the volatile memory 112 to store a virtual machine template 180 is less than the amount of memory to store virtual machines configured for each tenant. Accordingly, the approach to implement virtual machines using a virtual machine template 180 can reduce the amount of memory used in the volatile memory 112.

As described above, the virtual machine template 180 held by the volatile memory 112 enables the control program 702 to quickly replicate the virtual machine template 180 in adding a communication service or implementing a virtual machine for providing a communication service. However, the volatile memory 112 cannot use the memory resource storing the virtual machine template 180 to store data or perform other processing.

Therefore, in order to use the memory resource of the volatile memory 112 for processing of running virtual machines or other processing as much as possible, the control program 702 may store the deactivated virtual machine template 180 to the non-volatile memory 113 after S605. Thereafter, the control program 702 may delete the virtual machine template 180 held in the volatile memory 112. In this case, the control program 702 replicates the virtual machine template 180 from the non-volatile memory 113 at receipt of a request for addition of communication service.

If it is determined at S606 that a communication service related request to add, update, or delete a communication service provided to a tenant has been input by the administrator of the telecommunications carrier via the management terminal 900 connected with the communication node apparatus 10, the communication node apparatus 10 performs S610.

Figure 11:
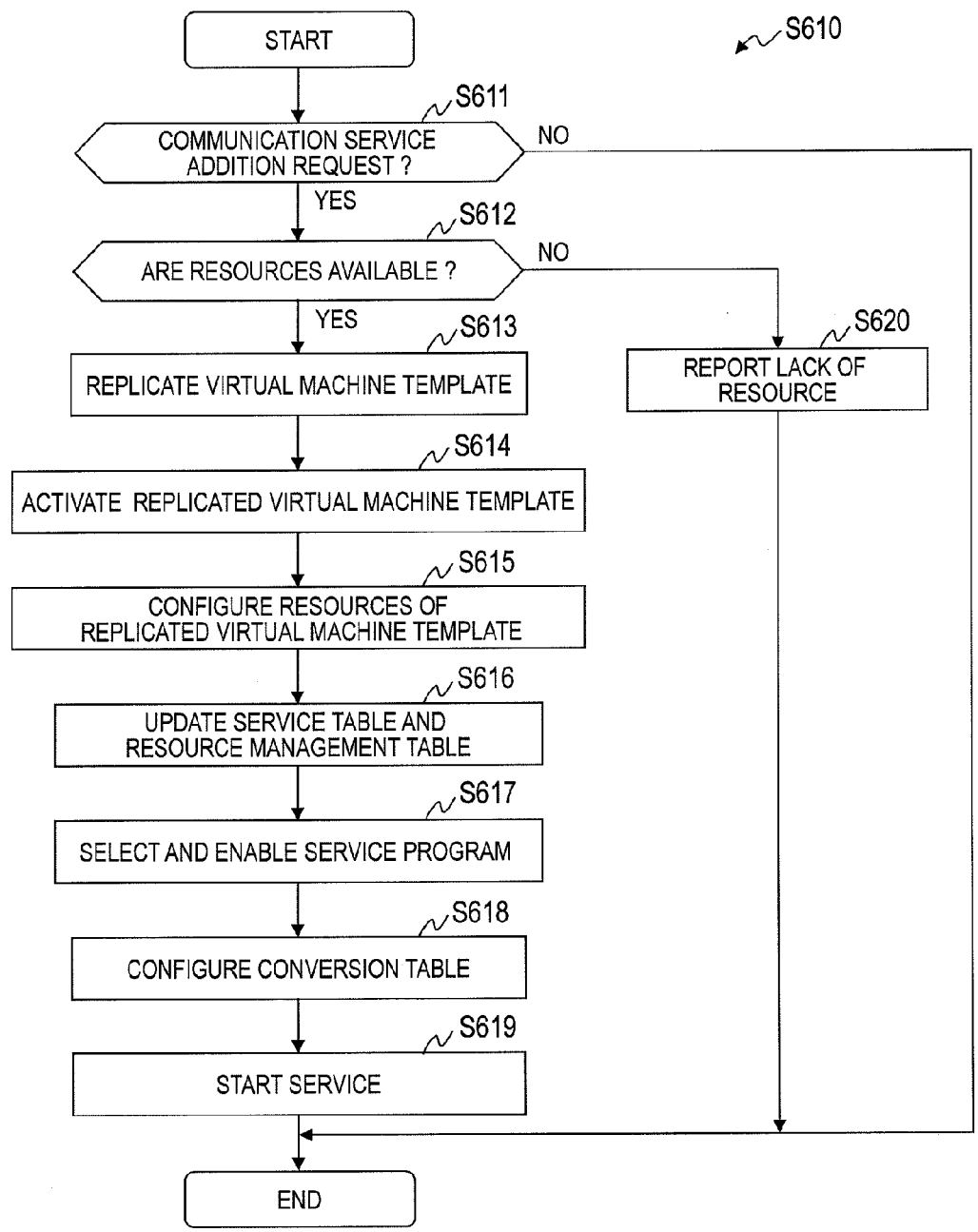
FIG. 11 is a flowchart illustrating adding a communication service in the embodiment.

FIG. 11 is a flowchart illustrating adding a communication service in this embodiment.

The control program 702 in the control card 200 determines whether the request input from the management terminal 900 is a request for addition of communication service (S611). If the request input from the management terminal 900 is not a request for addition of communication service, the control program 702 terminates the processing shown in FIG. 11.

If the determination is that the request input from the management terminal 900 is a request for addition of communication service, the control program 702 in the control card 200 determines whether the resources (processor cores, memory, and the values for LTAGs 717) can be reserved for allocation to the virtual machine to execute the communication service designated by the addition request with reference to the resource management table 701 (S612).

The control program 702 may also acquire information about the communication bandwidth from the transfer cards 400 (400-1, 400-2) and determine whether the bandwidth at the value of the bandwidth 711 required by the request for addition of communication service can be newly secured based on the acquired information. If the resource management table 701 holds values about the communication bandwidth of the communication node apparatus 10, the control program 702 may determine whether the communication bandwidth specified by the addition request can be secured as a resource to be allocated to the virtual machine based on the resource management table 701.

The addition request input from the management terminal 900 includes the identifier of the tenant (the value for the tenant 710) to use the communication service to be added, and the identifier of the communication service (the value for the service 712) to be added. The addition request input from the management terminal 900 further includes values for the bandwidth 711, the service quality 713, the allocated CPU core 714, and the allocated memory 715 for the communication service to be added.

If the determination at S612 is that the resources cannot be reserved, the control program 702 notifies the management terminal 900 of the lack of the resources (S620) and terminates the adding a communication service illustrated in FIG. 11.

If the determination at S612 is that the resources can be reserved, the control program 702 replicates the virtual machine template 180 held in the volatile memory 112 (or the non-volatile memory 113) once in the volatile memory 112 (S613).

After S613, the control program 702 activates the virtual machine template replicated from the virtual machine template 180 (S614). Since the original virtual machine template 180 is held in the volatile memory 112 or the non-volatile memory 113, the control program 702 can replicate a virtual machine template from the original virtual machine template 180 upon every receipt of a request for addition of communication service.

After S614, the control program 702 sets parameters for the virtual machine to execute the communication service designated by the addition request to the activated virtual machine template (S615). Specifically, the control program 702 allocates the processor cores and the memory specified by the addition request to the replicated virtual machine template from the resources reserved at S612.

Further, at S615, the control program 702 adds necessary VNICs to and deletes unnecessary VNICs from the replicated virtual machine template. For example, if the communication service to be provided to the tenant specified by the addition request requires three communication service virtual network interfaces and the virtual machine template includes only two communication service virtual network interfaces, the control program 702 adds a communication service virtual network interface to the replicated virtual machine template.

At S615, the control program 702 further sets the values for LTAGs reserved at S612 to the VNICs 183 and 184 (communication service virtual network interfaces) of the replicated virtual machine template as VLAN numbers and sets virtual MAC addresses and virtual IP addresses to the VNICs 183 and 184.

Furthermore, the control program 702 sets a predetermined control virtual MAC address to the VNIC 185 (control virtual network interface) included in the replicated virtual machine template. As a result, the administrator can change the configuration of the virtual machine after implementation.

If the replicated virtual machine template does not include a control virtual network interface, the control program 702 adds a control virtual network interface to the replicated virtual machine template.

At S615, the control program 702 further sets the communication bandwidth reserved at S612 to the chipset 111 of the information processing card 100 and the NP and chipsets 410 of the transfer cards 400. The control program 702 may also set parameters specific to the tenant designated by the addition request to the service program 181 corresponding to the communication service designated by the addition request.

Through the processing at S615, the program included in the replicated virtual machine template is configured as a virtual machine to provide the communication service designated by the addition request.

After S615, the control program 702 updates the resource management table 701 and the service table 700 (S616).

Specifically, at S616, the control program 702 adds, in the resource management table 701, the resources (the number of processor cores and the amount of memory) allocated to the virtual machine to provide the communication service to the number of allocated dedicated cores 743, the number of allocated shared cores 744, and the amount of allocated memory 745 of the entry representing the information processing card 100 in which the virtual machine is activated.

Further at S616, the control program 702 deletes the values for LTAG reserved at S612 from the unused LTAG 751 in the resource management table 701 (the unused LTAG 751 of the entry representing the communication node apparatus 10 activated at S601).

Still further at S616, the control program 702 adds a new entry to the service table 700 and stores values specified by the addition request received from the management terminal 900 in the tenant 710, the bandwidth 711, the service 712, the service quality 713, the allocated CPU core 714, and the allocated memory 715.

Still further at S616, the control program 702 acquires the value of the STAG based on the value of the tenant 710 specified by the request for addition of communication service. The control program 702 may acquire the value of the STAG from the edge switch 11 based on the value of the tenant 710.

Still further at S616, the control program 702 stores the acquired value of the STAG, the reserved values of LTAGs, and the values about the virtual machine configured at S615 in the STAG 716, LTAG 717, port 718, apparatus number 719, information processing card number 720, virtual machine number 721, and VNIC information 722 of the new entry in the service table 700. Through the foregoing operations, the service table 700 and the resource management table 701 are updated.

After S616, the control program 702 enables only the service program 181 corresponding to the communication service (corresponding to the service 712) specified by the received addition request among the one or more service programs 181 included in the configured virtual machine (S617). Specifically, the control program 702 deactivates the service programs 181 other than the service program 181 corresponding to the communication service designated by the addition request.

The processing at S617 configures the replicated virtual machine template as a virtual machine to provide the communication service designated by the addition request.

After S617, the control program 702 refers to the predetermined order of execution of communication services (the order of execution, such as FW for the first and WOC for the second) and the communication services to be provided to the tenant indicated in the service table 700 and inserts the entry indicating the communication service designated by the addition request to the conversion table 703 held in the volatile memory 412 in the transfer card 400 and the conversion table 703 held in the volatile memory 112 in the information processing card 100 (S618).

Thereafter, the control program 702 activates the virtual machine to execute the communication service designated by the addition request to start the communication service designated by the addition request (S619). After S619, the control program 702 terminates the processing illustrated in FIG. 11.

If the control program 702 receives a plurality of request for addition of communication services at S606, it replicates the virtual machine template 180 by repeating S606 and S610 for the same number of times as the number of received addition requests to create as many virtual machines as the received addition requests at S610.

Through the processing illustrated in FIGS. 9 and 11, the control program 702 in this embodiment replicates the virtual machine template 180 after receipt of a request for addition of communication service and properly implements a virtual machine for providing the communication service using the replicated virtual machine template. Hence, there is no need to receive an image of a virtual machine via a network to implement the virtual machine and the network resources are not consumed. In addition, the non-volatile memory 113 stores a smaller volume of boot image 704 to implement a virtual machine, achieving lower consumption of the resources such as a non-volatile memory.

When a request to update a communication service to be provided to a tenant (update request) is input to the communication node apparatus 10 from the management terminal 900 by the administrator of the telecommunications carrier, the control program 702 in the communication node apparatus 10 executes S610 in FIG. 9 and then executes S630.

Figure 12:
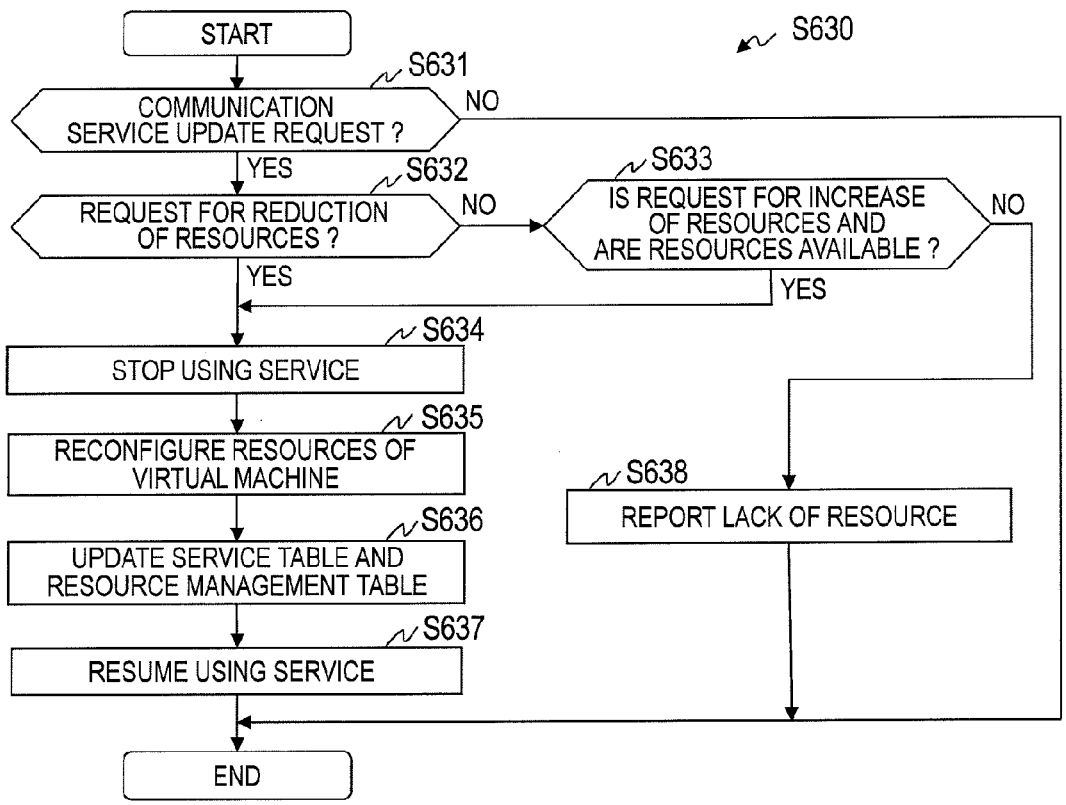
FIG. 12 is a flowchart illustrating updating a communication service in the embodiment.

FIG. 12 is a flowchart illustrating updating a communication service in this embodiment.

The updating a communication service in this embodiment means scaling down or scaling up the resources to execute the communication service.

The request for update of communication service includes the identifier of the tenant (the value of the tenant 710) for which resource allocation is updated and the identifier of the communication service (the value of the service 712) to which resource allocation is updated. Furthermore, the request for update of communication service includes values for the bandwidth 711, the service quality 713, the allocated CPU cores 714, and the allocated memory 715 for the values of the resources after the update.

The control program 702 determines whether the request input from the management terminal 900 at S606 is a request for update of communication service (S631). If the request input from the management terminal 900 is not a request for update of communication service, the control program 702 terminates the processing shown in FIG. 12.

If the request input from the management terminal 900 is a request for update of communication service, the control program 702 determines whether the request for update of communication service is a request to scale down the communication service (S632). Specifically, the control program 702 refers to the service table 700 to extract the entry including the values of the tenant 710 and the service 712 designated by the update request. If the values of the resources indicated by the extracted entry are larger than the values of the resources after the update specified by the update request, the control program 702 determines that the update request is a request to scale down the communication service.

If the request is determined to be a request for scaling down, the control program 702 stops providing the communication service designated by the update request in order to reduce the resources such as processor cores, memory, and the like allocated to the virtual machine providing the communication service designated by the update request (S634). Stopping providing the communication service or stopping the service program providing the communication service can help the control program 702 prevent a failure in providing the communication service in the course of changing the configuration of the virtual machine.

After S634, the control program 702 reduces the amount of resources (processor cores, memory, and the like) allocated to the virtual machine executing the communication service designated by the update request by a predetermined amount or in accordance with the update request. Through this operation, the control program 702 reconfigures the resources of the virtual machine (S635).

After S635, the control program 702 updates, in the resource management table 701, the number of allocated dedicated cores 743, the number of allocated shared cores 744, and the amount of allocated memory 745 of the entry representing the information processing card 100 including the virtual machine from which the resources have been reduced with the values of the results of subtracting the values indicating the amount of resources reduced at S635. The control program 702 further updates, in the service table 700, the values of the entry corresponding to the communication service designated by the update request (S636).

After S636, the control program 702 resumes the communication service designated by the update request (S637) and terminates the processing illustrated in FIG. 12.

If, at S632, the request for update of communication service is not determined to be a request to scale down the communication service, or the request is determined to be a request to scale up the communication service, the control program 702 determines whether the resources specified by the update request can be reserved (S633). Specifically, the control program 702 refers to the resource management table 701 and other information to determine whether the resources specified by the update request can be reserved, like at S612 of FIG. 11.

If the determination at S633 is that the resources specified by the update request cannot be reserved, the control program 702 notifies the management terminal 900 of the lack of resources (S638) and terminates the processing illustrated in FIG. 12.

If the determination at S633 is that the resources specified by the update request can be reserved, the control program 702 stops providing the communication service designated by the update request (S634).

After S634, the control program 702 increases the amount of resources (processor cores or memory) allocated to the virtual machine executing the communication service designated by the update request to reconfigure the resources of the virtual machine for the communication service designated by the update request (S635).

After S635, the control program 702 refers to the resource management table 701 and updates the number of allocated dedicated cores 743, the number of allocated shared cores 744, and the amount of allocated memory 745 of the entry representing the information processing card 100 including the virtual machine from which the resources have been increased with the values of the results of adding the values indicating the increased amounts of resources. The control program 702 further refers to the service table 700 and updates the values of the entry corresponding to the communication service designated by the update request (S636).

After S636, the control program 702 resumes the communication service designated by the update request (S637) and terminates the processing illustrated in FIG. 12.

When a request to delete a communication service (deletion request) is input to the communication node apparatus 10 from the management terminal 900 by the administrator of the telecommunications carrier, the control program 702 in the communication node apparatus 10 executes S610 and S630 in FIG. 9 and then executes S640.

Figure 13:
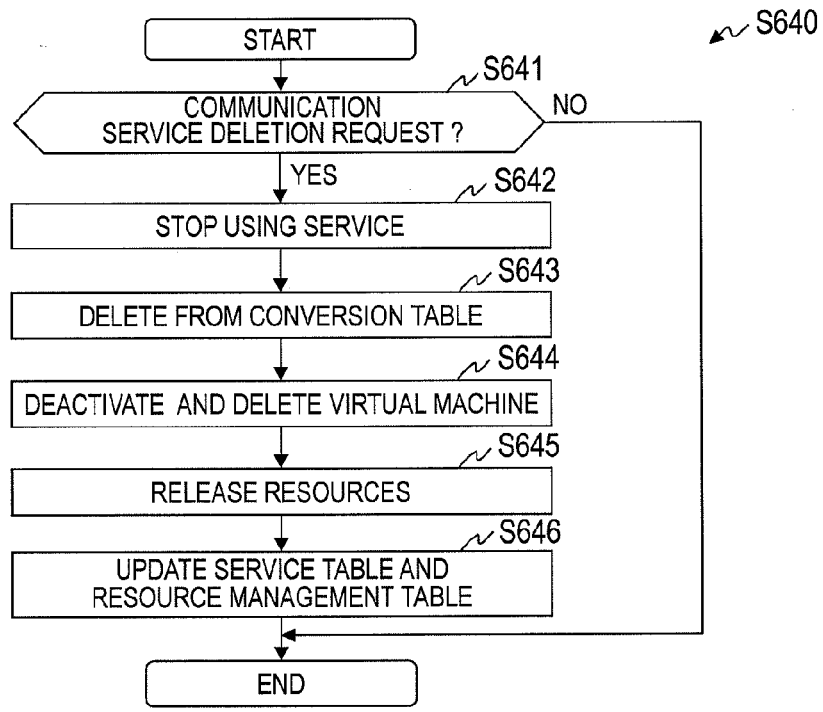
FIG. 13 is a flowchart illustrating deleting a communication service in the embodiment.

FIG. 13 is a flowchart illustrating deleting a communication service in this embodiment.

The control program 702 in the control card 200 determines whether the request input by the management terminal 900 is a request for deletion of communication service (S641). If the request input from the management terminal 900 is not a request for deletion of communication service, the control program 702 terminates the processing shown in FIG. 13.

The request for deletion of communication service includes at least the identifier identifying the tenant (the value of the tenant 710) for which a communication service is to be deleted in accordance with the deletion request and the identifier identifying the communication service (the value of the service 712) to be deleted.

If the control program 702 determines that a request for deletion of communication service has been input, it stops the service program in the information processing card 100 (the service program in the virtual machine) for executing the communication service on the information processing card 100 designated by the deletion request (S642). Stopping providing the communication service or stopping the service program can help the control program 702 prevent a failure in providing the communication service in the course of deleting the configuration of the virtual machine.

After S642, the control program 702 deletes the entries of the conversion tables 703 in the transfer card 400 and the information processing card 100 so that the communication service designated by the request for deletion of communication service will not be executed on the Ethernet Frames transmitted in the tenant specified by the request for deletion of communication service (S643).

Specifically, at S643, the control program 702 identifies the entries containing the identifier of the communication service designated by the deletion request in the SERVICE 52 among the entries of the conversion tables 703 for the tenant specified by the request for deletion of communication service and deletes the identified entries.

After S643, the control program 702 deactivates the virtual machine providing the communication service designated by the request for deletion of communication service and further, deletes the deactivated virtual machine from the volatile memory 112 (S644). Then, the control program 702 releases the resources (the bandwidth, processor cores, memory, and LTAGs) allocated to the virtual machine deleted at S644 (S645).

The control program 702 further refers to the resource management table 701 and subtracts the values indicating the amounts of resources released at S645 from the number of allocated dedicated cores 743, the number of allocated shared cores 744, and the amount of allocated memory 745 of the entry representing the information processing card 100 including the virtual machine deleted at S644. The control program 702 deletes the entry from the service table 700 in accordance with the request for deletion of communication service. Through the foregoing operations, the control program 702 updates the service table 700 and the resource management table 701 (S646) and terminates the processing illustrated in FIG. 13.

When a communication service is added to or deleted from the communication node apparatus 10 by the processing of FIG. 9, the tag conversion unit 417 in the transfer card 400 and the tag conversion unit 117 in the information processing card 100 of the communication node apparatus 10 start tag conversion in accordance with a new conversion table 703.

Figure 14:
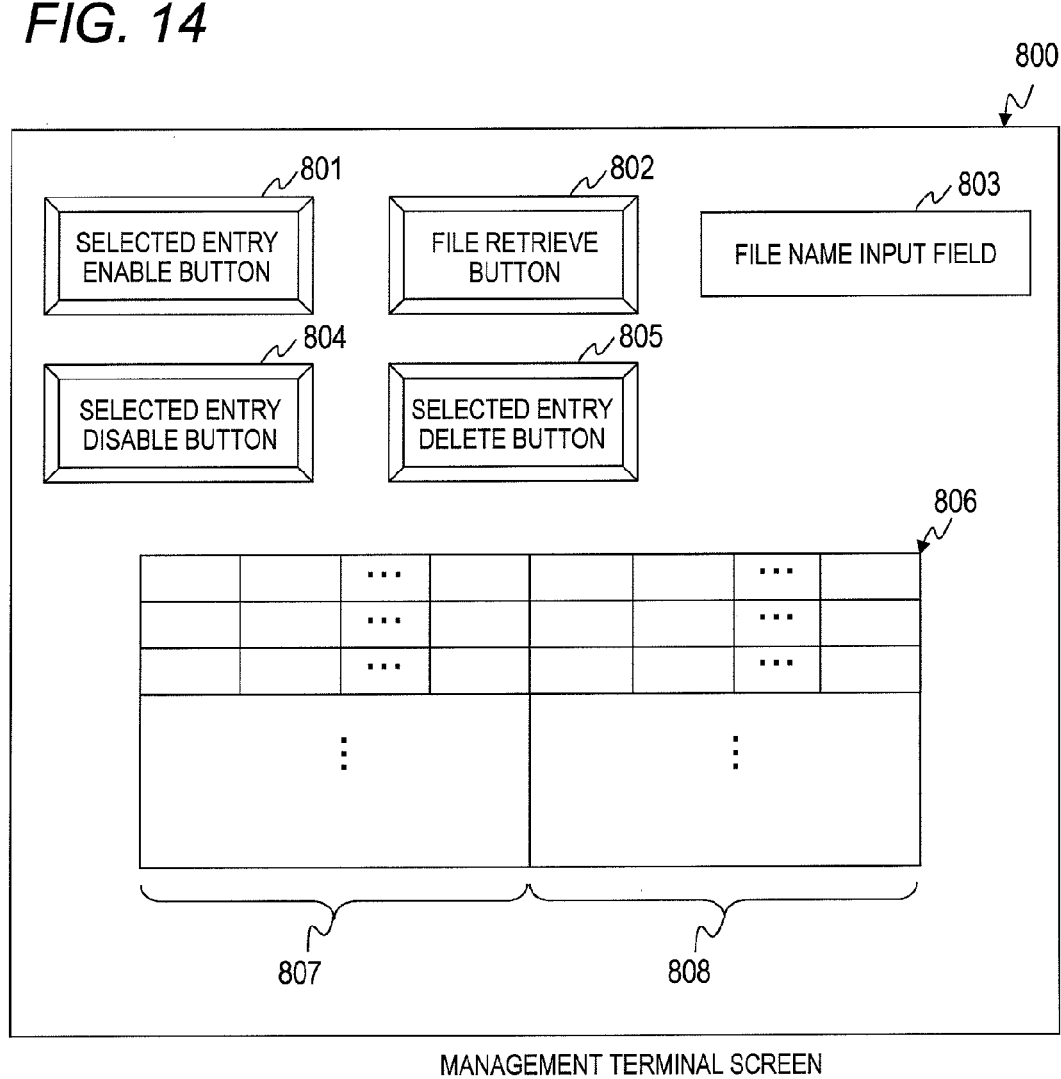
FIG. 14 is an explanatory diagram illustrating an example of a management terminal screen in the embodiment.

FIG. 14 shows a management terminal screen 800, which is an example of a screen displayed on the management terminal 900 when the administrator of the telecommunications carrier inputs a request for addition, update, or deletion of a communication service to the communication node apparatus 10 through the management terminal 900.

FIG. 14 is an explanatory diagram illustrating an example of the management terminal screen 800 in this embodiment.

The administrator inputs a communication service related request to the communication node apparatus 10 via the management terminal screen 800 appearing on the display of the management terminal 900.

The management terminal screen 800 includes a selected entry enable button 801, a file retrieve button 802, a file name input field 803, a selected entry disable button 804, a selected entry delete button 805, and a service table 806.

The selected entry enable button 801 is a button to enter the information set to the service table 806 to the communication node apparatus 10. The file retrieve button 802 is a button to deploy the contents of the file input in the file name input field 803 to the service table 806.

The selected entry disable button 804 is a button to set the communication service selected in the service table 806 in the state where it can be stopped. The selected entry delete button 806 is a button to delete the communication service selected in the service table 806.

The service table 806 is an area to show the information corresponding to the service table 700 shown in FIG. 6. The service table 806 includes an area 807 and an area 808.

The area 807 includes the values determined by the administrator as requested by a client. The area 807 is an area for showing the values of the tenant 710, bandwidth 711, service 712, service quality 713, allocated CPU core 714, and allocated memory 715 in the service table 700.

The area 808 is an area for showing the values automatically determined by the control program 702 of the communication node apparatus 10. The area 808 is an area for showing the values of the STAG 716, LTAG 717, port 718, apparatus number 719, information processing card number 720, VM number 721, and VNIC information 722.

The administrator sets parameters related to a communication service to the service table 806 in response to a request from a client. For example, in the case where the request from the client is to add a communication service to a tenant, the administrator selects a blank entry in the service table 806. The administrator inputs values for the tenant 710, bandwidth 711, service 712, service quality 713, allocated CPU core 714, and allocated memory 715 in the selected entry.

After the setting, the administrator enters the input values to the communication node apparatus 10 by clicking the selected entry enable button 801. This entering corresponds to the inputting a request for addition of communication service in FIG. 9.

The administrator does not need to manually input the values to the entry in the service table 806. Specifically, the administrator may first retrieve a file containing the information of the service table 806 to the memory of the management terminal 900 and deploy the information therein to the service table 806. In this case, the administrator inputs the name of the file containing the information of the service table 806 to the file name input field 803 and clicks the file retrieve button 802 to deploy the contents of the file to the service table 806.

In the case where the request of the client is for update (namely, scale-up or scale-down) of a communication service, the administrator selects an entry representing the communication service to be updated from the service table 806. The administrator clicks the selected entry disable button 804 with the entry being selected to set the selected communication service in the state where it can be stopped.

The administrator overwrites the information to be updated among the bandwidth 711, service quality 713, allocated CPU core 714, allocated memory 715, and the like. After the overwriting, the input information is entered to the communication node apparatus 10 by clicking the selected entry enable button 801. This entering corresponds to the inputting a request for update of communication service in FIG. 9.

In the case where the request of the client is for deletion of a communication service, the administrator selects an entry representing the communication service to be deleted from the service table 806. The administrator clicks the selected entry disable button 804 with the entry being selected to set the selected communication service in the state where it can be stopped. Thereafter, the administrator clicks the selected entry delete button 805 to input the communication service to be deleted to the communication node apparatus 10. This operation corresponds to the inputting a request for deletion of communication service in FIG. 9.

The above-described management terminal screen 800 is an example of a user interface. The administrator can input information to the management terminal 900 through any interface if the interface accepts input of a communication service related request.

Hereinafter, an example of usage of a communication node apparatus 10 is explained.

Figure 15:
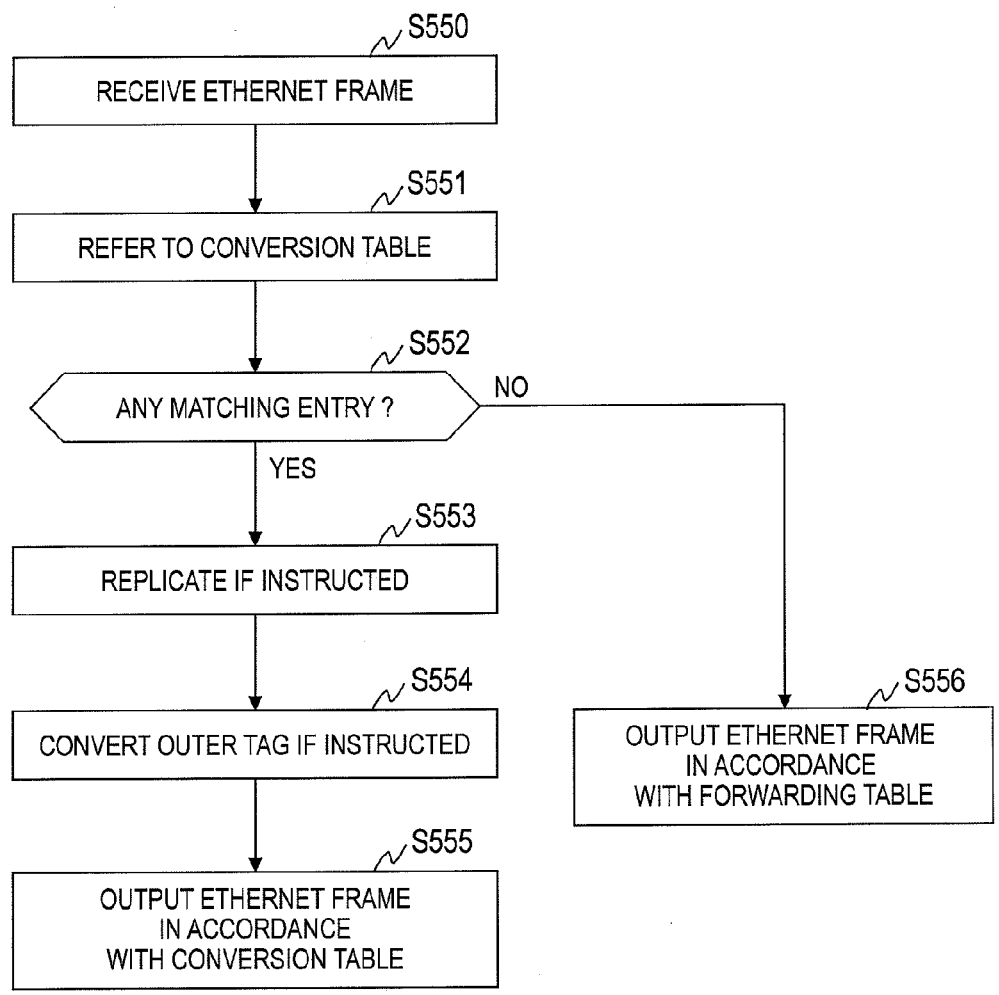
FIG. 15 is a flowchart illustrating tag conversion in a communication node apparatus in the embodiment.

FIG. 15 is a flowchart illustrating tag conversion in a communication node apparatus 10 in this embodiment.

Hereinafter, tag conversion by the tag conversion unit 417 is described with FIG. 15. It should be noted that the tag conversion by the tag conversion unit 117 and the tag conversion by the tag conversion unit 417 are explained by the same routine illustrated by FIG. 15.

Upon receipt of an Ethernet Frame at the transfer card 400 of the communication node apparatus 10, the NP and chipset 410 inputs the Ethernet Frame to the tag conversion unit 417 (S550). After S550, the tag conversion unit 417 refers to the conversion table 703 held in the volatile memory 412 (S551).

The processing at S550 and S551 is performed when an Ethernet Frame 82 is received from the WAN 4 or LAN 5 outside the communication node apparatus 10, when an Ethernet Frame 82 is received from another transfer card 400 in the communication node apparatus 10, when an Ethernet Frame 86 is received from the information processing card 100 in the communication node apparatus 10, or other occasion.

The tag conversion unit 417 determines whether the most anterior tag in the VLAN tags of the received Ethernet Frame and the value indicating the input source of the Ethernet Frame respectively match with the value of the IN TAG 40 and the value of the IN PORT 41 of any entry in the conversion table 703 (S552).

If the determination at S552 is that there is a matching entry in the conversion table 703, the tag conversion unit 417 determines whether the matching entry includes information of instruction for replication. In following example, the tag conversion unit 417 determines that the entry includes information of instruction for replication if the matching entry at S552 includes two or more values in the OUT TAG 50. However, the tag conversion unit 417 can make the determination by any other way if it can determine whether the Ethernet Frame includes information of instruction for replication.

If the matching entry does not include information indicating an instruction for replication, the tag conversion unit 417 executes S554. If the matching entry includes information indicating an instruction for replication, the tag conversion unit 417 replicates the received Ethernet Frame in accordance with the instruction for replication (S553).

After S553, the tag conversion unit 417 converts the outermost tag of the Ethernet Frame for extended VLAN tagged communication in accordance with the value of the OUT TAG 50 of the matching entry (S554). Then, it outputs the Ethernet Frame with the converted tag in accordance with the value of the OUT PORT 51 of the matching entry (S555).

If the determination at S552 is that there is no matching entry in the conversion table 703, the tag conversion unit 417 refers to the normal forwarding table (called MAC address table or FDB (Forwarding DataBase)) initially held in the NP and chipset 410 to send the received Ethernet Frame to the designated destination (S556).

Next, tag conversion by the tag conversion unit 117 is described with FIG. 15. The tag conversion unit 117 is to apply tag conversion to the Ethernet Frames sent from the virtual switch 190.

When the information processing card 100 receives an Ethernet Frame from the internal switch 300, the processor 110 makes the virtual switch 190 process the received Ethernet Frame. Upon receipt of the Ethernet Frame, the virtual switch 190 deletes the outermost VLAN tag from the Ethernet Frame. Then, the virtual switch 190 transfers the Ethernet Frame without the outermost VLAN tag to a virtual machine in accordance with the forwarding table initially held in the volatile memory 112.

Reversely, when the virtual switch 190 receives the Ethernet Frame from a virtual machine, the virtual switch 190 adds a VLAN tag (corresponding to an LTAG in this example) to the Ethernet Frame. Then, the virtual switch 190 transfers the Ethernet Frame including the VLAN tag to the chipset 111 in accordance with the forwarding table initially held in the volatile memory 112.

When the tag conversion unit 117 of the chipset 111 receives the Ethernet Frame (S550), it refers to the conversion table 703 held in the volatile memory 112 (S551). Then, the tag conversion unit 117 performs the same processing at S552 to S555 as the tag conversion unit 417 does.

The case of no matching entry at S552 performed by the tag conversion unit 117 happens only when the conversion table 703 is failed to be created. If the conversion table 703 has been created successfully, the tag conversion unit 117 can find a matching entry at S552.

The tag conversion unit 117 outputs the Ethernet Frame to the information processing card 100 including the tag conversion unit 117 (or the virtual switch 190 on the information processing card 100 performing the tag conversion), an information processing card 100 different from the information processing card 100 including the tag conversion unit 117 (or the virtual switch 190 on an information processing card different from the information processing card 100 performing the tag conversion), or a transfer card 400.

A specific example of the flowchart of FIG. 15 is described as follows.

Figure 16:
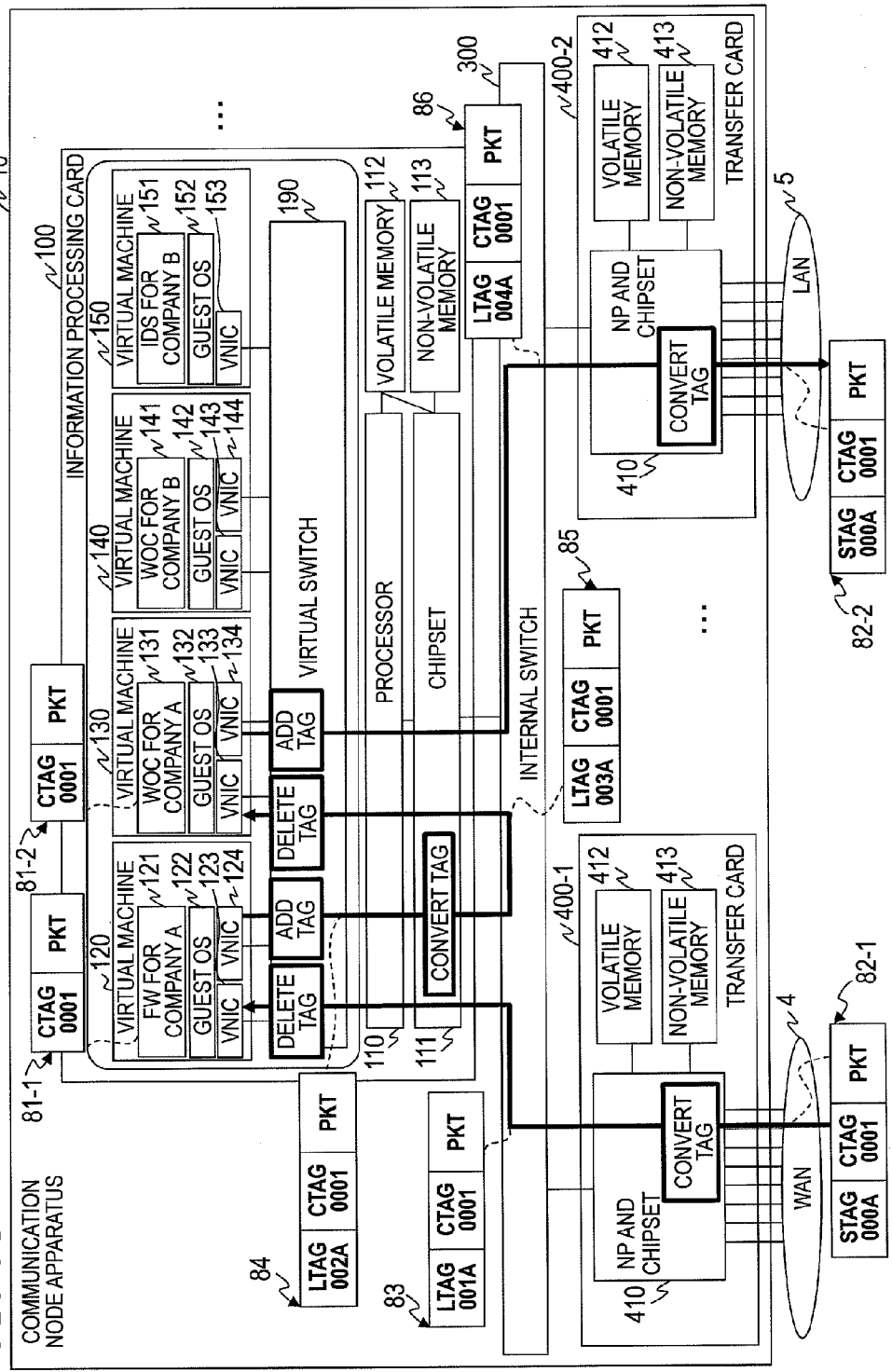
FIG. 16 is an explanatory diagram illustrating a specific example of tag conversion in the embodiment.

FIG. 16 is an explanatory diagram illustrating a specific example of tag conversion in this embodiment.

Illustrated in FIG. 16 is processing in the communication node apparatus 10 in the case where communication services of firewall (FW) and WAN optimization (WOC) are applied to the virtual network communication (wide area Ethernet communication using extended VLAN tagging) for Company A.

The communication node apparatus 10 shown in FIG. 16 receives an Ethernet Frame 82-1 from the WAN 4 and outputs an Ethernet Frame 82-2 to the LAN 5.

Figure 17:
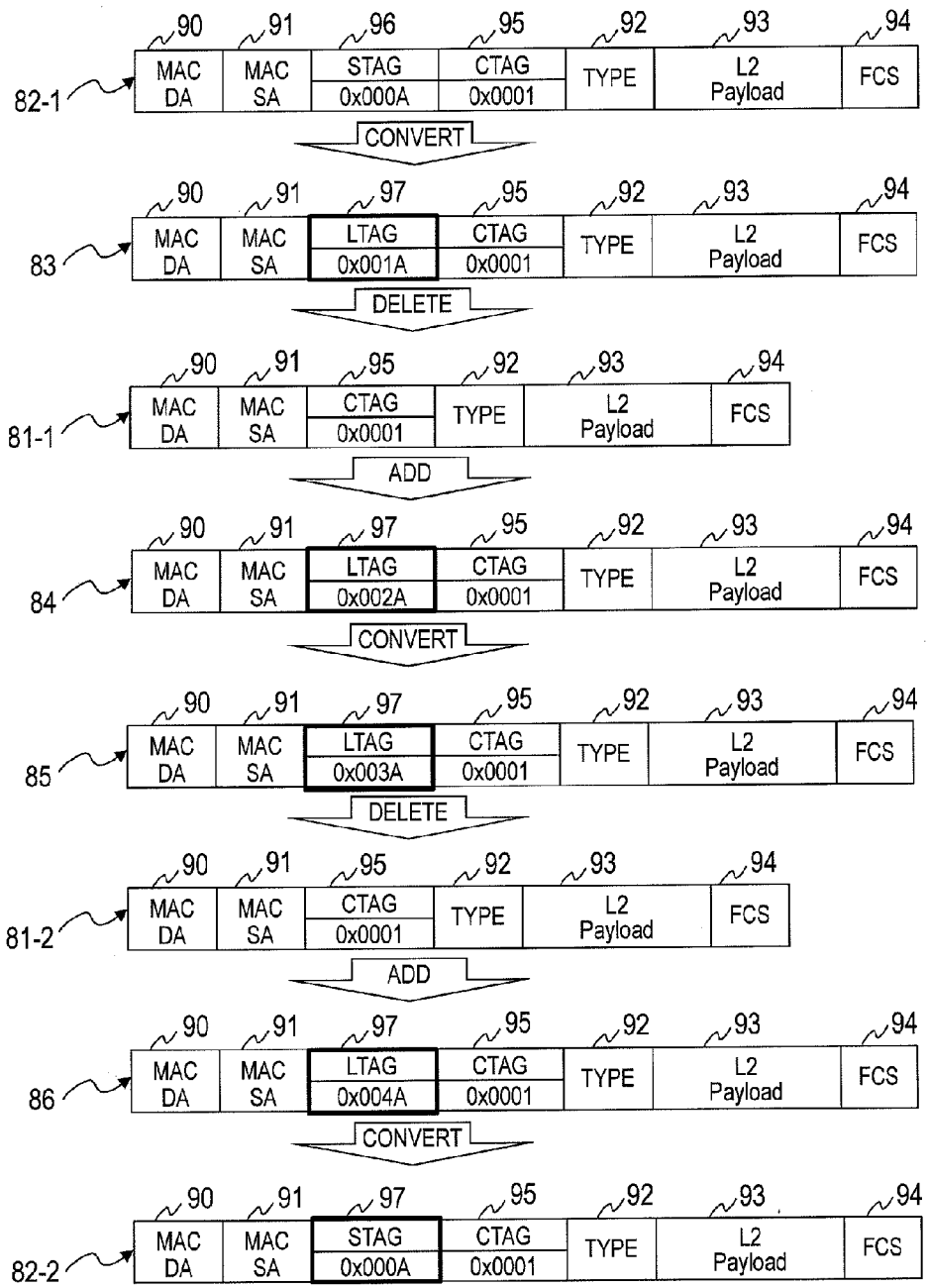
FIG. 17 is an explanatory diagram illustrating a specific example of an Ethernet Frame to which the tag conversion is applied in the embodiment.

FIG. 17 is an explanatory diagram illustrating a specific example of an Ethernet Frame to which the tag conversion is applied in this embodiment.

The Ethernet Frame 82-1 in FIG. 16 includes, like the Ethernet Frame 82 shown in FIG. 4, a MAC DA 90, a MAC SA 91, an STAG 96, a CTAG 95, a TYPE 92, an L2 Payload 93, and an FCS 94. The VID 34 of the STAG 96 shown in FIG. 16 is 0x000A, which is an identifier for the VID identifying Company A.

When the NP and chipset 410 in the transfer card 400-1 receives an Ethernet Frame 82-1 for extended VLAN tagged communication shown in FIG. 17 from the WAN 4 (S550), the tag conversion unit 417-1 refers to the conversion table 703 of FIG. 8 held in the volatile memory 412 (S551).

After S551, the tag conversion unit 417-1 determines that the Ethernet Frame 82-1 matches with the entry 762 in the conversion table 703 (in which the IN TAG 40 indicates an STAG 96 having VID=0x000A and the IN PORT 41 indicates the WAN 4) (S552). Since the OUT TAG 50 of the entry 762 contains one value (S553), the tag conversion unit 417-1 converts the STAG 96 of the Ethernet Frame 82-1 to an LTAG 97 including a VID 34 of 0x001A in accordance with the entry 762. This conversion creates the Ethernet Frame 83 in FIG. 17 (S554).

After S554, the tag conversion unit 417-1 outputs the Ethernet Frame 83 to the internal switch 300 in accordance with the OUT PORT 51 of the entry 762 (S555). Upon receipt of the Ethernet Frame 83, the internal switch 300 identifies the information processing card 100 allocated the VNIC of the virtual machine represented by the value 0x001A of the VID 34 in the LTAG 97 of the Ethernet Frame 83 (which is the VNIC 123) and transfers the Ethernet Frame 83 for the identified information processing card 100.

Upon receipt of the Ethernet Frame 83 at the information processing card 100, the virtual switch 190 deletes the outermost VLAN tag (the LTAG 97 in FIG. 17) to create an Ethernet Frame 81-1 and inputs the Ethernet Frame 81-1 to the VNIC 123 represented by the value 0x001A of the VID 34 of the deleted VLAN tag (in this case, the LTAG 97). At this time, the Ethernet Frame 81-1 is in a format including only the CTAG 95.

In this way, the firewall service program 121 for Company A on the guest OS 122 in the virtual machine 120 can execute the firewall service to the Ethernet Frame 81-1 input from the VNIC 123. Through the operations up to this step, the Ethernet Frame input to the firewall service program 121 for Company A is in a format including only the CTAG 95, which is used in Company A. Hence, the Ethernet Frames input to the program are guaranteed to be only Ethernet Frames for Company A and to apply the particular service (in this case, the firewall service) and there is no need to concern about inclusion of an Ethernet Frame for other company or not to apply the particular service. In this regard, the other virtual machines are the same as the virtual machine 120; they execute their communication services on Ethernet Frames 81 including only CTAGs 95.

If the Ethernet Frame 81-1 can pass through the firewall service program 121 for Company A (or is not blocked by the firewall), the virtual machine 120 outputs the Ethernet Frame 81-1 from the VNIC 124 to the virtual switch 190.

Upon receipt of the Ethernet Frame 81-1 from the VNIC 124, the virtual switch 190 adds an LTAG 97 representing the VNIC 124 (having a VID 34 of 0x002A) to the Ethernet Frame 81-1 to create the Ethernet Frame 84 in FIG. 17. Then, the virtual machine 120 sends the Ethernet Frame 84 to the chipset 111. The chipset 111 inputs the Ethernet Frame 84 to the tag conversion unit 117.

Upon receipt of the Ethernet Frame 84 (S550), the tag conversion unit 117 executes the processing of S551 to S555 in FIG. 15. The tag conversion unit 117 determines that the Ethernet Frame 84 matches with the entry 763 in the conversion table 703 (in which the IN TAG 40 contains an LTAG 97 having a VID=0x002A and the IN PORT 41 contains CARD#1 (the same information processing card 100)).

Since the OUT TAG 50 of the entry 763 contains a single value (S553), the tag conversion unit 117 converts the LTAG 97 to an LTAG 97 having a VID 34 of 0x003A in accordance with the OUT TAG 50 of the entry 763. Through this conversion, the Ethernet Frame 85 in FIG. 17 is created (S554).

The tag conversion unit 117 sends the Ethernet Frame 85 to the internal switch 300 in accordance with the OUT PORT 51 of the entry 763.

Upon receipt of the Ethernet Frame 85, the internal switch 300 identifies that the destination assigned the input source (the information processing card 100) of the Ethernet Frame 85 and the VNIC of the virtual machine represented by the value 0x003A for the VID 34 of the LTAG 97 (or the VNIC 133) is the information processing card 100 and transfers the Ethernet Frame 85 toward the identified information processing card 100.

When the information processing card 100 receives the Ethernet Frame 85, the virtual switch 190 deletes the outermost VLAN tag to create an Ethernet Frame 81-2 and inputs the Ethernet Frame to the VNIC 133 represented by the value 0x003A of the VID 34 of the deleted VLAN tag. At this time, the Ethernet Frame 81-2 is in a format including only a CTAG 95.

Hence, the WAN optimization service program 131 for Company A on the guest OS 132 of the virtual machine 130 can execute the WAN optimization service to the Ethernet Frame 81-2 input from the VNIC 133.

If the WAN optimization service program 131 for Company A determines the Ethernet Frame 81-2 to go for the LAN, the Ethernet Frame 81-2 is output from the VNIC 134 to the virtual switch 190. The virtual switch 190 adds an LTAG 97 (having a VID 34 of 0x004A) representing the VNIC 134 of the input source to the Ethernet Frame 81-2 to create the Ethernet Frame 86 in FIG. 17. Then, the virtual switch 190 inputs the Ethernet Frame 86 to the chipset 111.

Upon receipt of the Ethernet Frame 86 (S550), the tag conversion unit 117 of the chipset 111 executes the processing of FIG. 15. However, at S552, the tag conversion unit 117 determines that there is no matching entry in the conversion table 703. Accordingly, the tag conversion unit 117 outputs the Ethernet Frame 86 to the internal switch 300 in accordance with the forwarding table initially held (S556).

The internal switch 300 identifies that the destination associated with the input source of the Ethernet Frame 86 (the information processing card 100) and the value 0x004A of the VID 34 of the LTAG 97 is the transfer card 400-2 and outputs the Ethernet Frame 86 to the identified destination.

When the NP and chipset 410 of the transfer card 400-2 receives the Ethernet Frame 86 (S550), the tag conversion unit 417-2 starts the processing of FIG. 15. The tag conversion unit 417-2 determines that the Ethernet Frame 86 matches with the entry 764 of the conversion table 703 (in which the IN TAG 40 indicates an LTAG 97 having a VID 34=0x004A and the IN PORT 41 indicates CARD#1 (information processing card 100)) (S552).

Since the OUT TAG 50 of the entry 764 contains a single value (S553), the tag conversion unit 417-2 converts the LTAG 97 of the Ethernet Frame 86 into an STAG 96 having a VID 34 of 0x000A in accordance with the entry 764. This conversion creates an Ethernet Frame 82-2 (S554).

The tag conversion unit 417-2 outputs the Ethernet Frame 82-2 from the transfer card 400-2 to the LAN 5 in accordance with the OUTPUT PORT 51 of the entry 764 (S555).

Through the above-described processing, communication services can be applied to a virtual network service (a wide area Ethernet using extended VLAN tagging) for Company A.

Now, described hereinafter is another specific example of the processing of FIG. 15.

Figure 18:
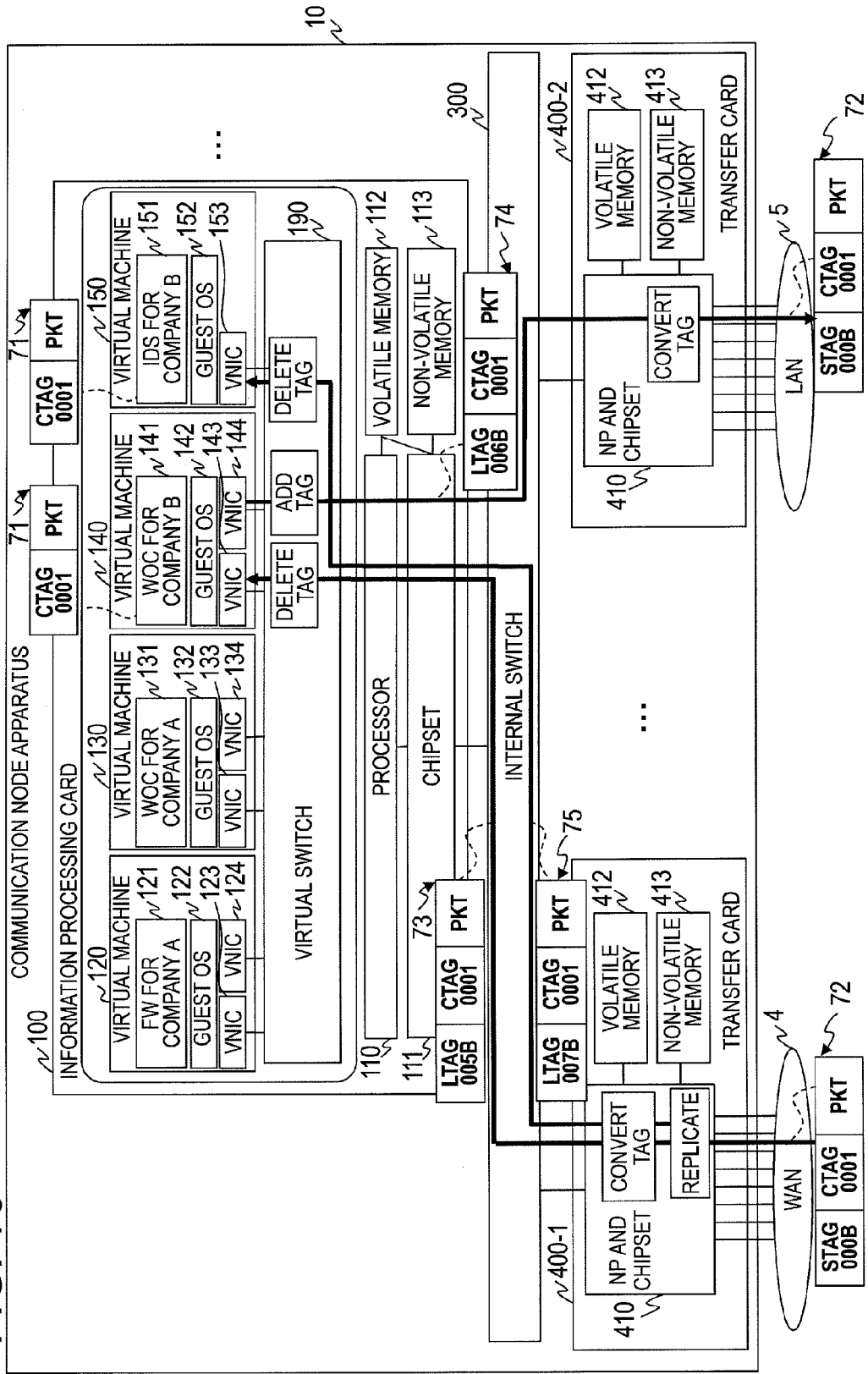
FIG. 18 is an explanatory diagram illustrating a specific example of tag conversion involving replication of an Ethernet Frame in the embodiment.

FIG. 18 is an explanatory diagram illustrating a specific example of tag conversion involving replication of an Ethernet Frame in this embodiment.

Illustrated in FIG. 18 is processing in the communication node apparatus 10 in the case where communication services of intrusion detection (IDS: Intrusion Detection System) and WAN optimization are applied to the virtual network communication (wide area Ethernet communication using extended VLAN tagging) for Company B.

The communication node apparatus 10 shown in FIG. 18 receives an Ethernet Frame 72 from the WAN 4 and outputs an Ethernet Frame 72 to the LAN 5.

Figure 19:
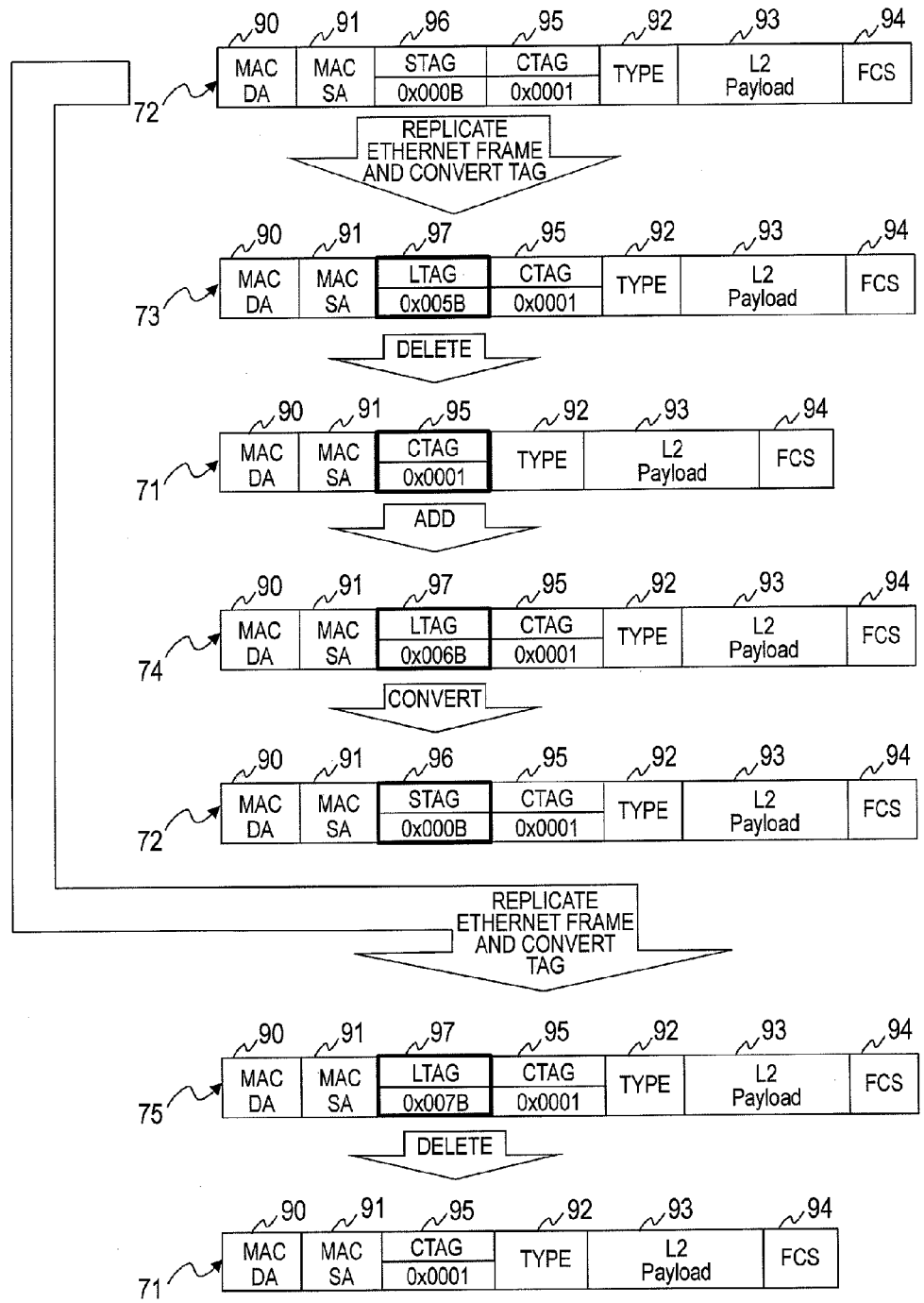
FIG. 19 is an explanatory diagram illustrating an Ethernet Frame replicated at tag conversion in the embodiment.

FIG. 19 is an explanatory diagram illustrating a specific example of an Ethernet Frame replicated at tag conversion in this embodiment.

The Ethernet Frame 72 in FIG. 19 includes, like the Ethernet Frame 82 shown in FIG. 4, a MAC DA 90, a MAC SA 91, an STAG 96, a CTAG 95, a TYPE 92, an L2 Payload 93, and an FCS 94. The VID 34 of the STAG 96 in FIG. 19 is 0x000B, which is an identifier for the VID identifying Company B.

When the NP and chipset 410 in the transfer card 400-1 receives an Ethernet Frame 72 for extended VLAN tagged communication from the WAN 4 (S550), the tag conversion unit 417-1 refers to the conversion table 703 of FIG. 8 held in the volatile memory 412 (S551).

After S551, the tag conversion unit 417-1 determines that the Ethernet Frame 72 matches with the entry 765 in the conversion table 703 (in which the IN TAG 40 indicates an STAG 96 having VID=0x000B and the IN PORT 41 indicates the WAN 4) (S552). After S552, the tag conversion unit 417-1 replicates the Ethernet Frame 72 into two Ethernet Frames in accordance with the entry 765 (S553) because the OUT TAG 50 of the entry 765 contains two values.

After S553, the tag conversion unit 417-1 converts the STAG 96 of one of the Ethernet Frames 72 to an LTAG 97 including a VID 34 of 0x005B. This conversion creates the Ethernet Frame 73 shown in FIG. 19 (S554).

Also, the tag conversion unit 417-1 converts the STAG 96 of the other Ethernet Frame 72 to an LTAG 97 including a VID 34 of 0x007B. This conversion creates the Ethernet Frame 75 shown in FIG. 19 (S554).

After S554, the tag conversion unit 417-1 outputs the Ethernet Frames 73 and 75 to the internal switch 300 in accordance with the OUT PORT 51 of the entry 765 (S555).

Upon receipt of the Ethernet Frame 75, the internal switch 300 identifies that the destination associated with the input source of the Ethernet Frame 75 and the VNIC 153 of the virtual machine represented by the value 0x007B of the VID 34 in the LTAG 97 of the Ethernet Frame 75 is the information processing card 100 and transfers the Ethernet Frame 75 to the identified information processing card 100.

When the information processing card 100 receives the Ethernet Frame 75, the virtual switch 190 deletes the outermost VLAN tag to create the Ethernet Frame 71 and transfers the Ethernet Frame 71 to the VNIC 153 represented by the value 0x007B of the VID 34 of the deleted VLAN tag. At this time, the Ethernet Frame 71 is in a format including only the CTAG 95.

In this way, the IDS service program 151 for Company B on the guest OS 152 of the virtual machine 150 can execute the IDS service to the Ethernet Frame 71 input from the VNIC 153.

The result of the processing by the IDS service program 151 for Company B is not sent to the LAN 5 in the form of an Ethernet Frame but stored in the virtual machine 150 (physically, the information processing card 100). Accordingly, the administrator may acquire the result of the processing by the IDS service program 151 for Company B via the VNIC 153 or a different VNIC port newly provided to acquire the result.

In the meanwhile, when the internal switch 300 receives the Ethernet Frame 73, the internal switch 300 identifies that the destination associated with the input source of the Ethernet Frame 73 and the VNIC of the virtual machine represented by the value 0x005B of the VID 34 in the LTAG 97 of the Ethernet Frame 73 is the information processing card 100 and transfers the Ethernet Frame 73 to the identified information processing card 100.

Upon receipt of the Ethernet Frame 73 at the information processing card 100, the virtual switch 190 deletes the outermost VLAN tag to create an Ethernet Frame 71 and transfers the Ethernet Frame 71 to the VNIC 143 represented by the value 0x005B of the VID 34 of the deleted VLAN tag. At this time, the Ethernet Frame 71 is in a format including only the CTAG 95.

In this way, the WAN optimization service program 141 for Company B on the guest OS 142 of the virtual machine 140 can execute the WAN optimization service for Company B on the Ethernet Frame 71 input from the VNIC 143.

If the WAN optimization service program 141 for Company B determines the Ethernet Frame 71 to go for the LAN, the Ethernet Frame 71 is output from the VNIC 144 to the virtual switch 190. The virtual switch 190 adds an LTAG 97 representing the input source of the VNIC 144 (having a VIC 34 of 0x006B) to the Ethernet Frame 71 to create an Ethernet Frame 74 shown in FIG. 19. Then, the virtual switch 190 inputs the Ethernet Frame 74 to the chipset 111.

Upon receipt of the Ethernet Frame 74 (S550), the tag conversion unit 117 of the chipset 111 executes the processing of FIG. 15. However, at S552, the tag conversion unit 117 determines that there is no matching entry in the conversion table 703. Accordingly, the tag conversion unit 117 outputs the Ethernet Frame 74 to the internal switch 300 in accordance with the forwarding table initially held (S556).

Upon receipt of the Ethernet Frame 74, the internal switch 300 identifies that the destination associated with the information on the input source and the value 0x006B of the VID 34 in the LTAG 97 is the transfer card 400-2 and outputs the Ethernet Frame 74 to the identified destination.

When the NP and chipset 410 of the transfer card 400-2 receives the Ethernet Frame 74 (S550), the tag conversion unit 417-2 starts the processing of FIG. 15. The tag conversion unit 417-2 determines that the Ethernet Frame 74 matches with the entry 766 of the conversion table 703 (in which the IN TAG 40 contains an LTAG 97 having a VID 34=0x006B and the IN PORT 41 contains CARD#1 (information processing card 100)) (S552).

Since the OUT TAG 50 of the entry 766 contains a single value (S553), the tag conversion unit 417-2 converts the LTAG 97 of the Ethernet Frame 74 into an STAG 96 having a VID 34 of 0x000B in accordance with the entry 766. This conversion creates an Ethernet Frame 72 (S554).

The tag conversion unit 417-2 outputs the Ethernet Frame 72 from the transfer card 400-2 to the LAN 5 in accordance with the OUTPUT PORT 51 of the entry 766 (S555).

Through the above-described processing, communication services can be applied to the virtual network service (a wide area Ethernet communication using extended VLAN tagging) for Company B.

Now, described hereinafter is a modified example of the processing illustrated in FIG. 16.

Figure 20:
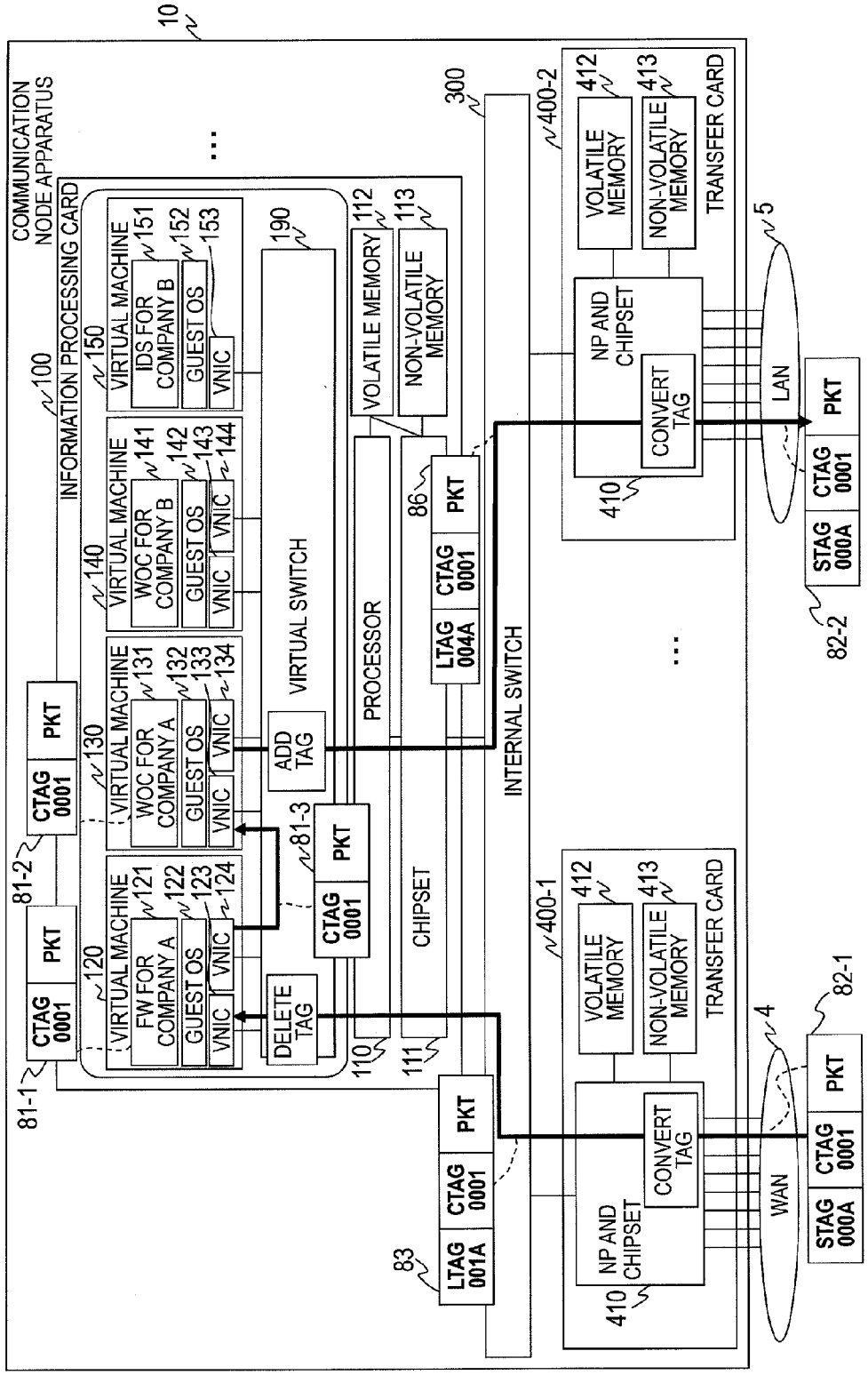
FIG. 20 is an explanatory diagram illustrating tag conversion in successively executing communication services in the embodiment.

FIG. 20 is an explanatory diagram illustrating tag conversion in successively executing communication services in this embodiment.

In the case where the same processor 110 of the same information processing card 100 successively executes a plurality of communication services like the communication services for Company A illustrated in FIG. 16 (the FW in the virtual machine 120 and the WOC in the virtual machine 130), the administrator may eliminate the processing for the virtual switch 190 to add an LTAG 97 between the two communication services (or the two virtual machines).

The administrator configures the virtual switch common to the two communication services so as to connect the output VNIC for a communication service with the input VNIC for the other communication service, so that Ethernet Frames which have been processed by one communication service (Ethernet Frames including only CTAGs 95) are directly sent to the virtual machine to execute the processing of the other communication service. As a result, the tag conversion by the tag conversion unit 117 is reduced to achieve speedy processing.

For example, the administrator may configure the virtual switch 190 so that Ethernet Frames will be transmitted only between the VNIC 124 for the firewall service program 121 for Company A and the VNIC 133 for the WAN optimization service program 131 for Company A as shown in FIG. 20. Since the tag conversion unit 117 does not add LTAGs 97, the two virtual machines use Ethernet Frames 81 including only CTAGs 95.

The processing illustrated in FIG. 20 can be implemented, for example, by configuring the virtual switch 190 so that the output of the VNIC 124 will be the input of the VNIC 133 and the output of the VNIC 133 will be the input of the VNIC 124 by the administrator. When this virtual switch 190 receives an Ethernet Frame from an interface such as the VNIC 124 or a physical NIC, it refers to the forwarding table held in the volatile memory 112 and transfers the Ethernet Frame or adds/deletes a VLAN tag. The other processing are the same as that illustrated in FIG. 16.

Figure 21:
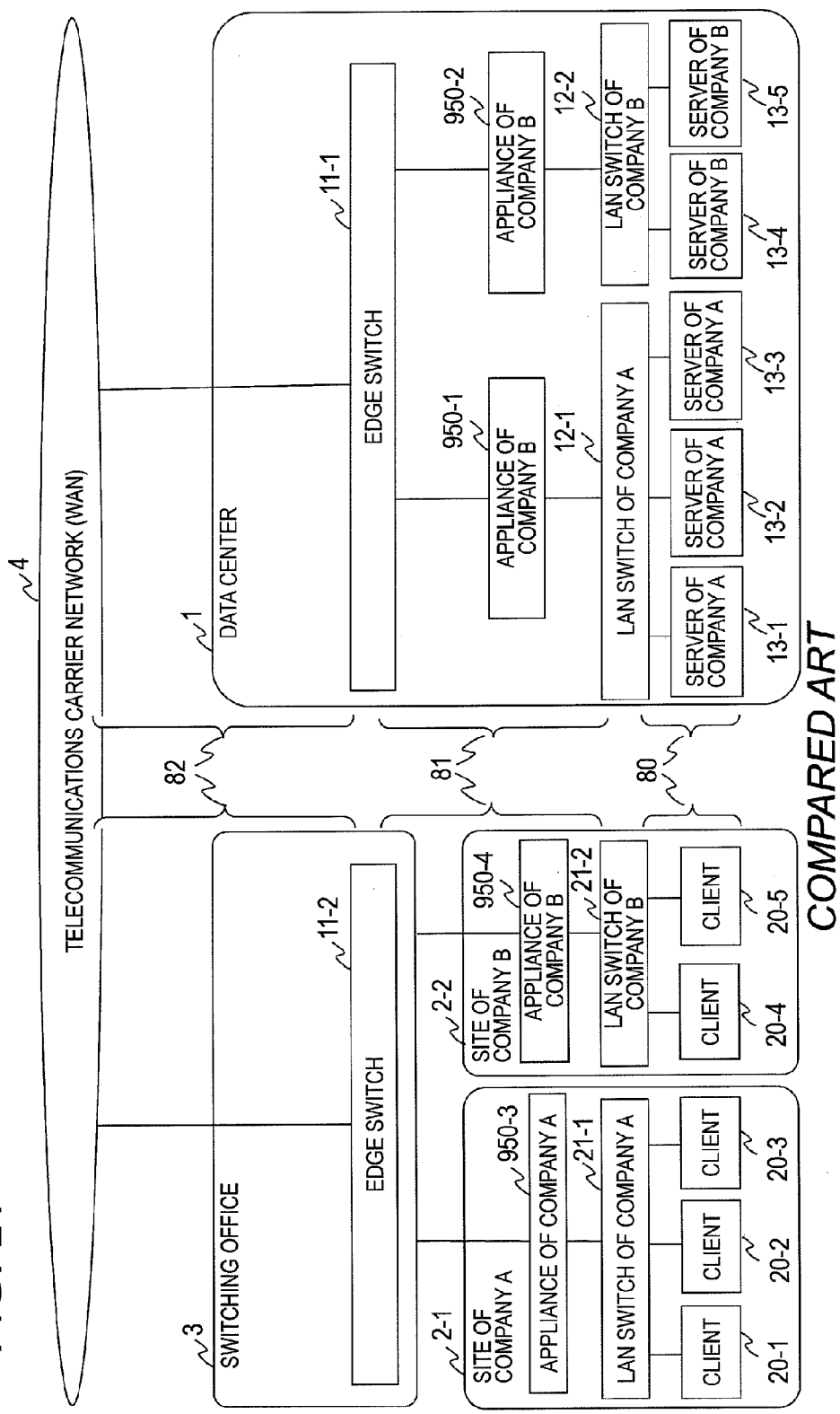
FIG. 21 is a block diagram illustrating a comparative example to the system configuration for providing communication services in the embodiment.

FIG. 21 illustrates a system configuration to be compared with the foregoing system of this embodiment.

FIG. 21 is a block diagram illustrating a comparative example to the system configuration for providing communication services in this embodiment.

The system configuration shown in FIG. 21 illustrates architecture for the telecommunications carrier to provide communication services such as WAN optimization and firewall on a wide area Ethernet.

Differences between the system configuration of FIG. 1 and the system configuration of FIG. 21 are described as follows. The first difference is that the switching office 3 in FIG. 21 does not have the communication node apparatus 10-2 and the data center 1 does not have the communication node apparatus 10-1. The second difference is that independent appliances 950 (950-3, 950-4) for individual tenants (clients) are connected between the edge switch 11-2 and the clients' respective LAN switches 21. The third difference is that independent appliances 950 (950-1, 950-2) for individual tenants (clients) are connected between the edge switch 11-1 and the clients' respective LAN switches 12.

If the appliances 950 in FIG. 21 are provided by the telecommunications carrier, both of Company A and Company B can use their respective communication services in the wide area Ethernet provided by the telecommunications carrier since the appliances 950 are independent between the tenants.

If the number of tenants (clients) provided with communication services is small, the telecommunications carrier can provide tenant-specific communication services by the system configuration shown in FIG. 21. However, if the number of tenants is large, the system of FIG. 21 requires a large number of appliances 950, leading to increase in equipment cost and operation cost.

On the other hand, in the system configuration of this embodiment shown in FIG. 1, the communication node apparatuses 10 (10-1, 10-2) include virtual machines for providing communication services; accordingly, the required number of communication node apparatuses 10

(corresponding to appliances) can be small. This embodiment enables the telecommunications carrier to create the facility to provide communication services at a low cost.

As described above, the communication node apparatus 10 in this embodiment enables a network including a plurality of virtual networks to provide different communication services to individual virtual networks by converting STAGs identifying tenants and the plurality of virtual networks such as VLANs into LTAGs for the processing in the communication node apparatus 10.

Furthermore, the telecommunications carrier can achieve low equipment and operation cost by running the appliances for executing communication services on the virtual machines in the communication node apparatus 10 shared by the tenants.

It should be noted that the communication node apparatus 10 in the foregoing embodiment may identify virtual networks by Ethernet Frames other than extended VLAN tagged Ethernet Frames. Hereinafter, examples employing Ethernet Frames other than extended VLAN tagged Ethernet Frames are described.

To achieve the wide area Ethernet explained in this embodiment, not only the extended VLAN tagging but also the technology of MAC-in-MAC defined by IEEE 802.1ah may be utilized. The MAC-in-MAC is a technology that makes communications while encapsulating an Ethernet Frame (MAC frame) in an Ethernet Frame (MAC frame).

There are two methods for MAC-in-MAC. One method encapsulates an Ethernet Frame including an STAG and a CTAG for extended VLAN tagged communication in a MAC frame to encapsulate an Ethernet Frame in an Ethernet Frame (MAC frame). The other method encapsulates an Ethernet Frame including a CTAG in a MAC frame.

The MAC-in-MAC Ethernet Frame by the first method is received by the communication node apparatus 10 in this embodiment as an Ethernet Frame 82 for extended VLAN tagged communication. Accordingly, the communication node apparatus 10 in this embodiment does not need to regard the received Ethernet Frame as a MAC-in-MAC Ethernet Frame for special processing.

Figure 22:
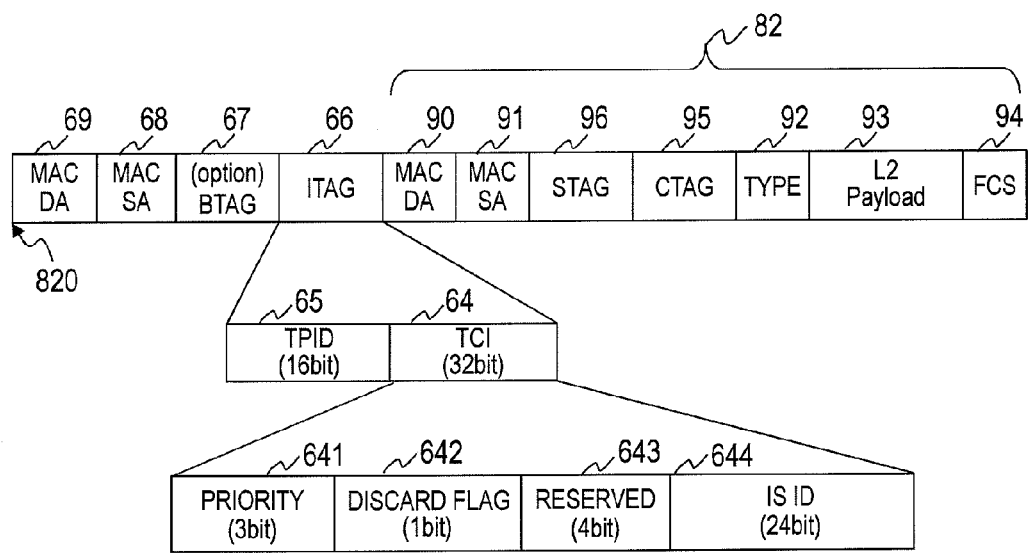
FIG. 22 is an explanatory diagram illustrating an Ethernet Frame for MAC in MAC in the embodiment.

The MAC-in-MAC Ethernet Frame by the second method is illustrated in FIG. 22.

FIG. 22 is an explanatory diagram illustrating an Ethernet Frame for MAC-in-MAC in this embodiment.

The MAC-in-MAC Ethernet Frame 820 by the second method includes an Ethernet Frame 82 and a header added to the outside of the Ethernet Frame 82. The header added to the outside of the Ethernet Frame 82 includes a MAC DA 69, a MAC SA 68, a BTAG 67, and an ITAG 66.

The ITAG 66 contains a 6-byte value for identifying a tenant. The 18-byte section consisting of the MAC DA 90 and MAC SA 91 of the Ethernet Frame 82 and the ITAG 66 may be defined as the ITAG.

The ITAG 66 contains a TPID 65 and a TCI 64. The TCI 64 contains a PRIORITY 641, a DISCARD FLAG 642, a RESERVED 643 and an IS ID 644. Since the ITAG 66 includes the IS ID 644, a 24-bit identifier called Service Instance ID, the ITAG 66 can identify a larger number of tenants than an STAG including a 12-bit VID.

In the case of employing the MAC-in-MAC by the second method in this invention, the tag conversion unit 417 converts the ITAG 66 to an LTAG 97, instead of the STAG 96 of an Ethernet Frame 82. The control program 702 stores a value identifying the ITAG 66 in the service table 700 and the conversion table 703, instead of a value identifying the STAG 96.

The LTAG 97 created by converting the ITAG 66 may be in the same format as that of the ITAG 66 or in the same format as that of the VLAN tag in a BTAG 67 included as an option of the MAC-in-MAC.

Another modified example of this embodiment is a method that uses VXLAN discussed by IETF (Internet Engineering Task Force), instead of extended VLAN tagging for VLANs.

Figure 23:
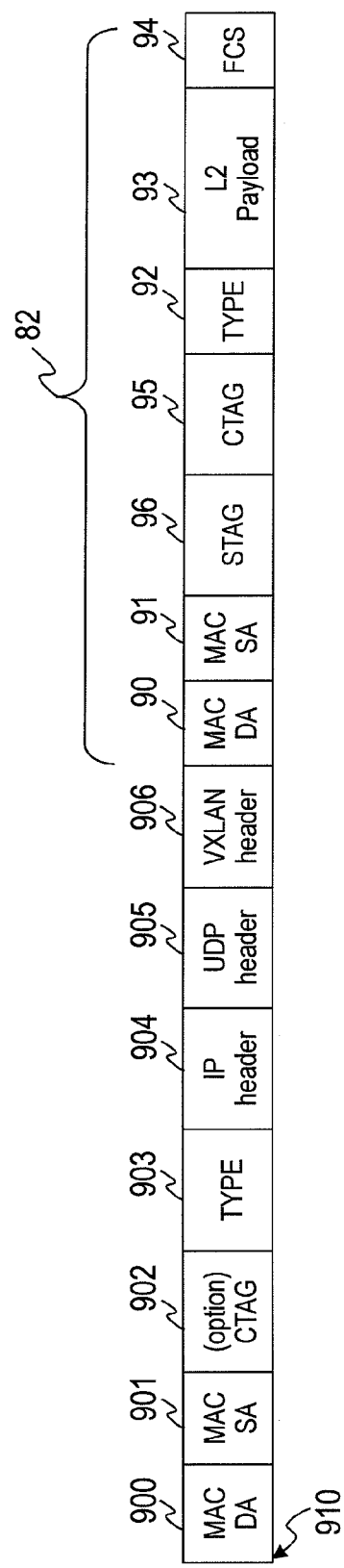
FIG. 23 is an explanatory diagram illustrating an Ethernet Frame for VXLAN in the embodiment.

FIG. 23 is an explanatory diagram illustrating an Ethernet Frame 910 for VXLAN in this embodiment.

The VXLAN is a technology that encapsulates an Ethernet Frame 82 in an Ethernet Frame for UDP/IP to make communications using the encapsulated Ethernet Frame. The Ethernet Frame for UDP/IP in the VXLAN includes an 8-byte VXLAN header 906 including a 24-bit identifier ahead of the payload.

The VXLAN is a technology discussed aiming to construct a large-scale multitenant cloud and achieve transparent disaster recovery among a plurality of sites.

In the case of application of VXLAN to this embodiment, the tag conversion unit 417 converts the VXLAN header 906 instead of the STAG 96 of the Ethernet Frame to the LTAG 97. The control program 702 stores values of the VXLAN header 906 in the service table 700 and the conversion table 703, instead of the value of the STAG 96.

The LTAG 97 created by converting the VXLAN header 906 may be in the same format as that of the VXLAN header 906 or the same format as that of the CTAG 902 (same as the VLAN tag) specified for the VXLAN as an option.

As described above, in either case of using the MAC-in-MAC or the VXLAN, converting the identifier included in an Ethernet Frame into an LTAG and combining the identifier with a virtual machine to execute a communication service such as WAN optimization can be performed by the same methods used by the communication node apparatus 10 described in the embodiment.

Therefore, this embodiment is applicable to various schemes for specifying an Ethernet Frame format, providing a communication method that can be flexibly applied to various network systems.

The foregoing embodiment described a method for a plurality of virtual machines in one information processing card 100 to successively execute communication services, a method for a plurality of virtual machines in one information processing card 100 to execute communication services in parallel, and a method of configuring the communication node apparatus so as to perform these methods. The foregoing methods are the simplest examples; for example, the tag conversion unit 417 replicates an Ethernet Frame into multiple Ethernet Frames and then communication services may be successively executed on the replicated Ethernet Frames.

As set forth in the embodiment recited above, a network including a plurality of virtual networks can provide a boot image for providing each virtual network with at least one communication service, such as WAN optimization and firewall, through virtual machines running on a communication node apparatus 10 with a small capacity non-volatile semiconductor memory in the communication node apparatus 10. As a result, low consumption of resources such as network resources and a non-volatile semiconductor memory is achieved to implement virtual machines for providing communication services.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A virtual machine processing apparatus connected in a communication path between a server and a client for transmitting Ethernet Frames via a physical network, the virtual machine processing apparatus comprising:
    an information processing unit including at least one virtual machine for executing a communication service to the Ethernet Frames; and
    a control unit for controlling the virtual machine processing apparatus,
    wherein the information processing unit includes:
    a first memory for storing a boot image including a primary virtual machine template which is a program for executing a virtual machine; and
    a second memory used to execute the communication service,
    wherein the control unit loads the boot image from the first memory to the second memory,
    wherein the control unit creates a secondary virtual machine template for executing a virtual machine by reconfiguring the primary virtual machine template,
    wherein the control unit stores the secondary virtual machine template in the second memory,
    wherein, upon receipt of a request for addition of communication service, the control unit creates a replicate secondary virtual machine template by replicating the second virtual machine template,
    wherein the control unit creates a virtual machine for the communication service by reconfiguring the replicate secondary virtual machine template in accordance with a request for addition of the communication service,
    wherein the boot image includes a program to execute a virtual switch,
    wherein the primary virtual machine template includes a program for executing at least one virtual network interface for connecting with the virtual switch, and
    wherein the control unit configures the at least one virtual network interface included in the primary virtual machine template to receive the Ethernet Frames when the control unit creates the secondary virtual machine template.

2. The virtual machine processing apparatus according to claim 1, wherein the control unit assigns parameters to receive an instruction to reconfigure the virtual machine to one of the at least one virtual network interface included in the primary virtual machine template.

3. The virtual machine processing apparatus according to claim 1,
    wherein the information processing unit includes at least one processor core,
    wherein, in accordance with the request for addition of communication service, the control unit allocates the at least one processor core and the second memory included in the information processing unit and assigns a virtual MAC address to be used by the at least one virtual network interface to reconfigure the replicate secondary virtual machine template to the configuration in accordance with the request for addition of communication service, and
    wherein, in a case where the replicate secondary virtual machine template includes a communication service which is not requested to be added by the request for addition of communication service, the control unit deactivates the communication service which is not requested to be added included in the replicated secondary virtual machine template.

4. The virtual machine processing apparatus according to claim 3,
    wherein after the deactivating the secondary virtual machine template, the control unit moves the deactivated secondary virtual machine template to the first memory,
    wherein, upon receipt of the request for addition of communication service, the control unit loads the replicate secondary virtual machine template to the second memory, and
    wherein the control unit activates the replicate secondary virtual machine template in the second memory.

5. The virtual machine processing apparatus according to claim 4, wherein, in a case where the control unit is requested to add a plurality of services by the request for addition of communication service, the control unit replicates the secondary virtual machine template to obtain as many replicate virtual machine templates as the communication services specified by the request for addition of communication service.

6. The virtual machine processing apparatus according to claim 5,
    wherein, upon receipt of a request for update of the communication service, the control unit deactivates the virtual machine to execute a communication service designated by the request for update of the communication service,
    wherein the control unit reconfigures the deactivated virtual machine in accordance with the request for update of the communication service,
    wherein the control unit activates the reconfigured virtual machine,
    wherein, upon receipt of a request for deletion of the communication service, the control unit deactivates the virtual machine to execute a communication service designated by the request for deletion of the communication service,
    wherein the control unit deletes the virtual machine deactivated in response to the request for deletion of the communication service, and
    wherein the control unit releases resources of the information processing unit allocated to the virtual machine deactivated in response to the request for deletion of the communication service.

7. A configuration method for a virtual machine processing apparatus connected in a communication path between a server and a client for transmitting Ethernet Frames via a physical network, the virtual machine processing apparatus including:
an information processing unit including at least one virtual machine for executing a communication service to the Ethernet Frames; and
a control unit for controlling the communication apparatus,
the information processing unit including:
a first memory for storing a boot image including a primary virtual machine template which is a program for executing a virtual machine; and
a second memory used to execute the communication service, the configuration method comprising:
a step of loading, by the control unit, the boot image from the first memory to the second memory,
a step of creating, by the control unit, a secondary virtual machine template for executing a virtual machine by reconfiguring the primary virtual machine template;
a step of storing, by the control unit, the secondary virtual machine template in the second memory;
a step of creating, by the control unit, a replicate secondary virtual machine template by replicating the secondary virtual machine template upon receipt of a request for addition of communication service;
a step of creating, by the control unit, a virtual machine for the communication service by reconfiguring the replicate secondary virtual machine template in accordance with a request for addition of the communication service,
wherein the boot image includes a program to execute a virtual switch, wherein the primary virtual machine template includes a program for executing at least one virtual network interface for connecting with the virtual switch, and
wherein the configuration method further comprises a step of configuring, by the control unit, the at least one virtual network interface included in the primary virtual machine template in order to receive the Ethernet Frames during the step of creating the secondary virtual machine template.

8. The configuration method according to claim 7, further comprising a step of assigning, by the control unit, parameters to receive an instruction to reconfigure the virtual machine to one of the at least one virtual network interface included in the primary virtual machine template.

9. The configuration method according to claim 7, wherein the information processing unit includes at least one processor core,
wherein the step of creating the virtual machine includes a step of allocating, by the control unit, the at least one processor core and the second memory included in the information processing unit and assigning a virtual MAC address to be used by the at least one virtual network interface to reconfigure the replicate secondary virtual template to the configuration in accordance with the request for addition of communication service, and
wherein, in a case where the replicate secondary virtual machine template includes a communication service which is not requested to be added by the request for addition of communication service, the configuration method comprises a step of deactivating, by the control unit, the communication service which is not requested to be added included in the replicate secondary virtual machine template.

10. The configuration method according to claim 9, further comprising a step of moving, by the control unit, the deactivated secondary virtual machine template to the first memory after the deactivating the activated virtual machine template,
wherein the step of creating the replicate secondary virtual machine template includes a step of loading, by the control unit, the replicate secondary virtual machine template to the second memory upon receipt of the request for addition of communication service, and
wherein the configuration methods further comprising a step of activating by the control unit, the replicate secondary virtual machine template in the second memory.

11. The configuration method according to claim 10, wherein the step of creating the replicate secondary virtual machine template includes, in a case where the control unit is requested to add a plurality of services by the request for addition of communication service, a step of replicating, by the control unit, the secondary virtual machine template to obtain as many replicate virtual machine templates as the communication services specified by the request for addition of communication service.

12. The virtual machine processing apparatus according to claim 1,
wherein, upon activation of the virtual machine processing apparatus, the control unit loads the boot image from the first memory to the second memory,
wherein the control unit activates the primary virtual machine template included in the loaded boot image on the second memory, and
wherein the control unit deactivates the secondary virtual machine template and stores the secondary virtual machine in the second memory after creating the secondary virtual machine template by reconfiguring the activated primary virtual machine template to execute the virtual machine.

13. The virtual machine processing apparatus according to claim 1, wherein the primary virtual machine template includes a program for executing an operating system for executing the virtual machine in the information processing unit, the at least one communication service.

14. The virtual machine processing apparatus according to claim 1,
wherein the first memory is non-volatile memory, and
wherein the second memory is volatile memory.

15. The configuration method according to claim 7, further comprising:
a step of loading, by the control unit the boot image from the first memory to the second memory upon activation of the virtual machine processing apparatus;
a step of activating, by the control unit, the primary virtual machine template included in the loaded boot image on the second memory;
a step of deactivating, by the control unit, the secondary virtual machine template after creating the secondary virtual machine template by reconfiguring the activated primary virtual machine template to execute the virtual machine; and
a step of storing the secondary virtual machine in the second memory after creating the secondary virtual machine template by reconfiguring the activated primary virtual machine template to execute the virtual machine.

16. The configuration method according to claim 7, wherein the primary virtual machine template includes a program for executing an operating system for executing the virtual machine in the information processing unit, for the at least one communication service.

17. The configuration method according to claim 7, wherein the first memory is non-volatile memory, and wherein the second memory is volatile memory.

18. The configuration method according to claim 11, further comprising:
- a step of deactivating, by the control unit, the virtual machine to execute a communication service designated by a request for update of the communication service upon receipt of the request for update of the communication;
- a step of reconfiguring, by the control unit, the deactivated virtual machine in accordance with the request for update of the communication;
- a step of activating, by the control unit, the reconfigured virtual machine;
- a step of deactivating, by the control unit, the virtual machine to execute a communication service designated by a request for deletion of the communication service upon receipt of the request for deletion of the communication service;
- a step of deleting, by the control unit, the virtual machine deactivated in response to the request for deletion of the communication service; and
- a step of releasing, by the control unit, resources of the information processing unit allocated to the virtual machine deactivated in response to the request for deletion of the communication service.

* * * * *